(12) United States Patent
Aoki et al.

(10) Patent No.: US 9,883,408 B2
(45) Date of Patent: Jan. 30, 2018

(54) GATEWAY APPARATUS AND COMMUNICATIONS SYSTEM

(71) Applicant: FUJITSU LIMITED, Kawasaki-shi, Kanagawa (JP)

(72) Inventors: Yuta Aoki, Nakahara (JP); Akira Hirata, Yokohama (JP); Osamu Yamano, Yokohama (JP); Naoto Sato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/268,231

(22) Filed: Sep. 16, 2016

(65) Prior Publication Data

US 2017/0006478 A1    Jan. 5, 2017

Related U.S. Application Data

(63) Continuation of application No. PCT/JP2014/059580, filed on Mar. 31, 2014.

(51) Int. Cl.
*H04W 16/18* (2009.01)
*H04W 88/18* (2009.01)
(Continued)

(52) U.S. Cl.
CPC .......... *H04W 16/18* (2013.01); *H04W 24/02* (2013.01); *H04W 84/045* (2013.01); *H04W 88/181* (2013.01)

(58) Field of Classification Search
CPC ........ H04W 36/02; H04W 4/00; H04W 16/18
See application file for complete search history.

(56) References Cited

U.S. PATENT DOCUMENTS

2010/0130208 A1* 5/2010 Hayashi ................ H04W 36/02
                                                      455/436
2012/0039171 A1    2/2012   Yamada et al.
(Continued)

FOREIGN PATENT DOCUMENTS

JP        05-236137 A     9/1993
JP      2001-169360 A     6/2001
(Continued)

OTHER PUBLICATIONS

International Search Report and International Preliminary Report on Patentability issued in International Patent Application No. PCT/JP2014/059580 dated May 27, 2014. (with partial translation).
(Continued)

*Primary Examiner* — Myron K Wyche
(74) *Attorney, Agent, or Firm* — Arent Fox LLP

(57) ABSTRACT

A gateway apparatus including a first inter-device interface configured to communicate with a monitoring apparatus; a second inter-device interface configured to communicate with a plurality of base station apparatuses that are subordinate; and a processor configured to generate second configuration information by a protocol conversion of converting first configuration information to a format compatible with the second inter-device interface, when the first configuration information is received from the monitoring apparatus through the first inter-device interface, the processor further configured to transmit the generated second configuration information to the plurality of base station apparatuses through the second inter-device interface.

13 Claims, 26 Drawing Sheets

(51) Int. Cl.
*H04W 24/02* (2009.01)
*H04W 84/04* (2009.01)

(56) References Cited

U.S. PATENT DOCUMENTS

2013/0136072 A1* 5/2013 Bachmann .............. H04W 4/00
370/329
2013/0294396 A1 11/2013 Iwamura et al.

FOREIGN PATENT DOCUMENTS

| JP | 2012-119826 A | 6/2012 |
| JP | 2012-529806 A | 11/2012 |
| JP | 2013-536636 A | 9/2013 |

OTHER PUBLICATIONS

Japanese Office Action of related Japanese Patent Application No. 2016-511227 dated Nov. 14, 2017.

* cited by examiner

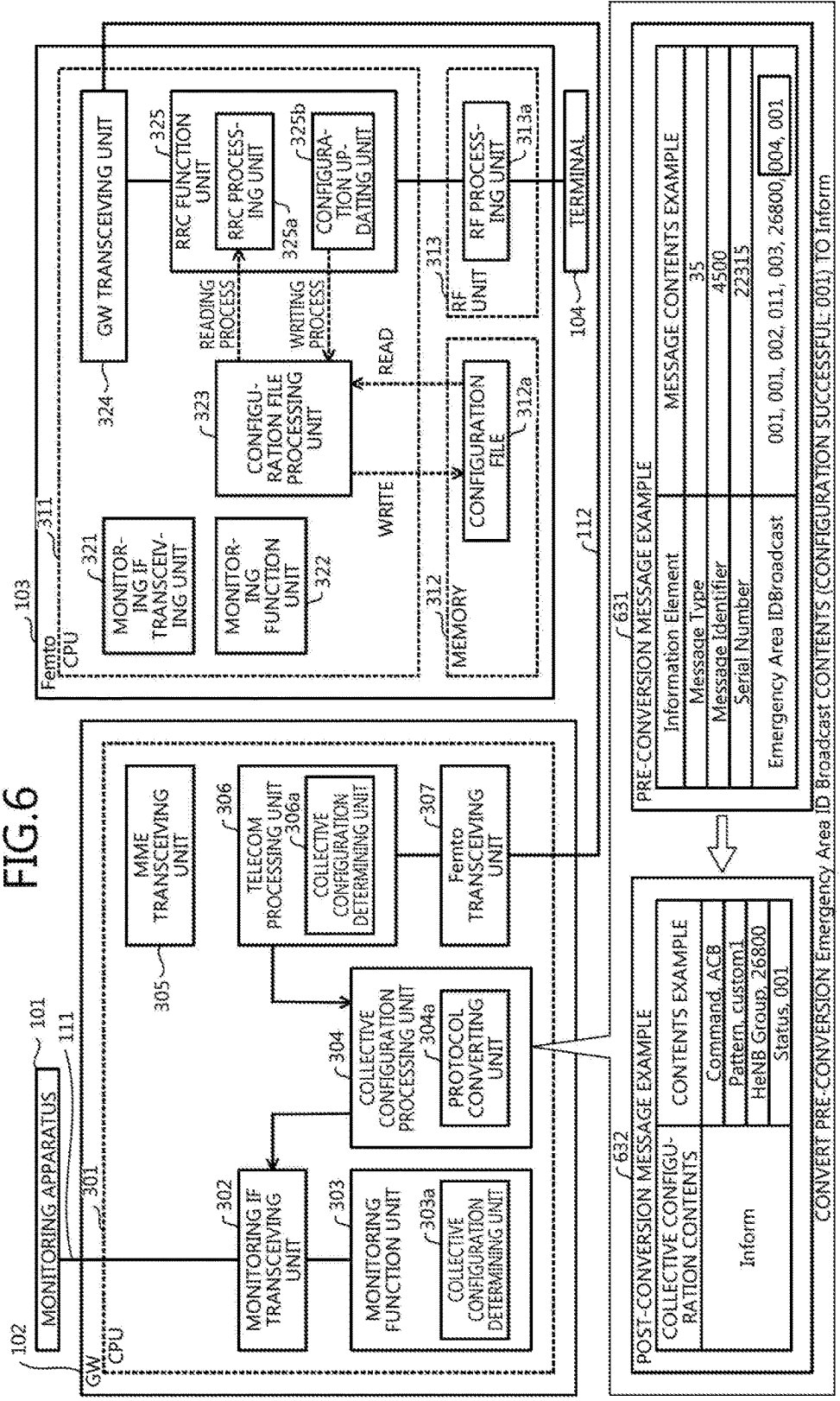

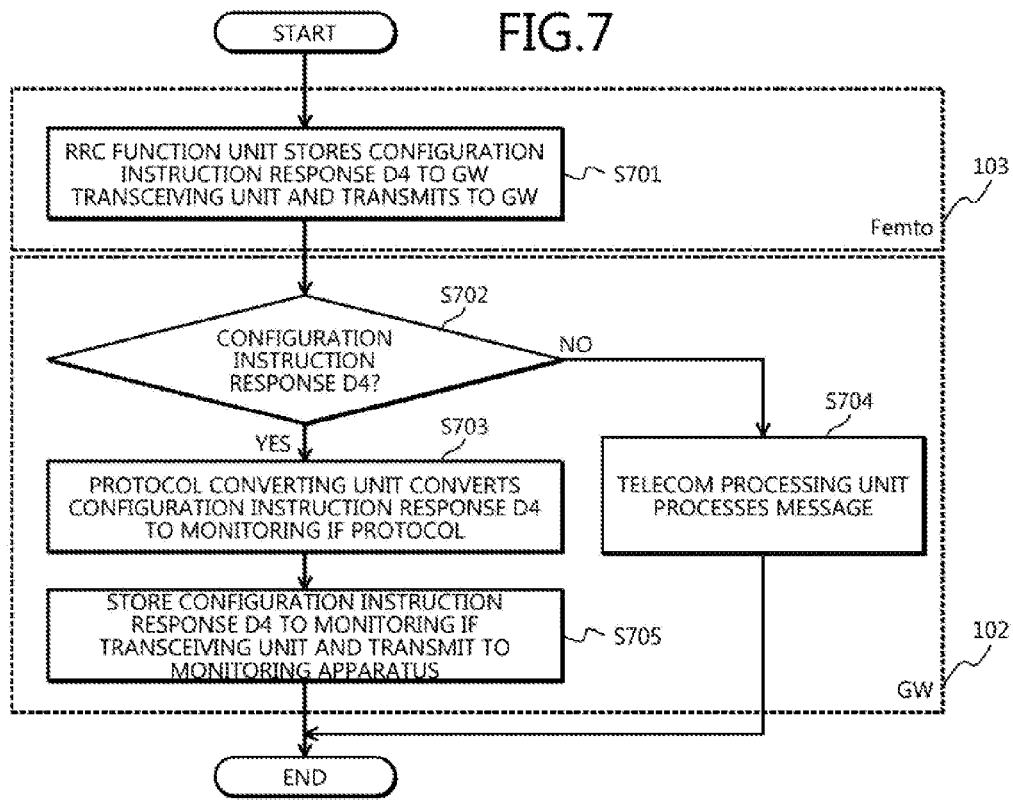

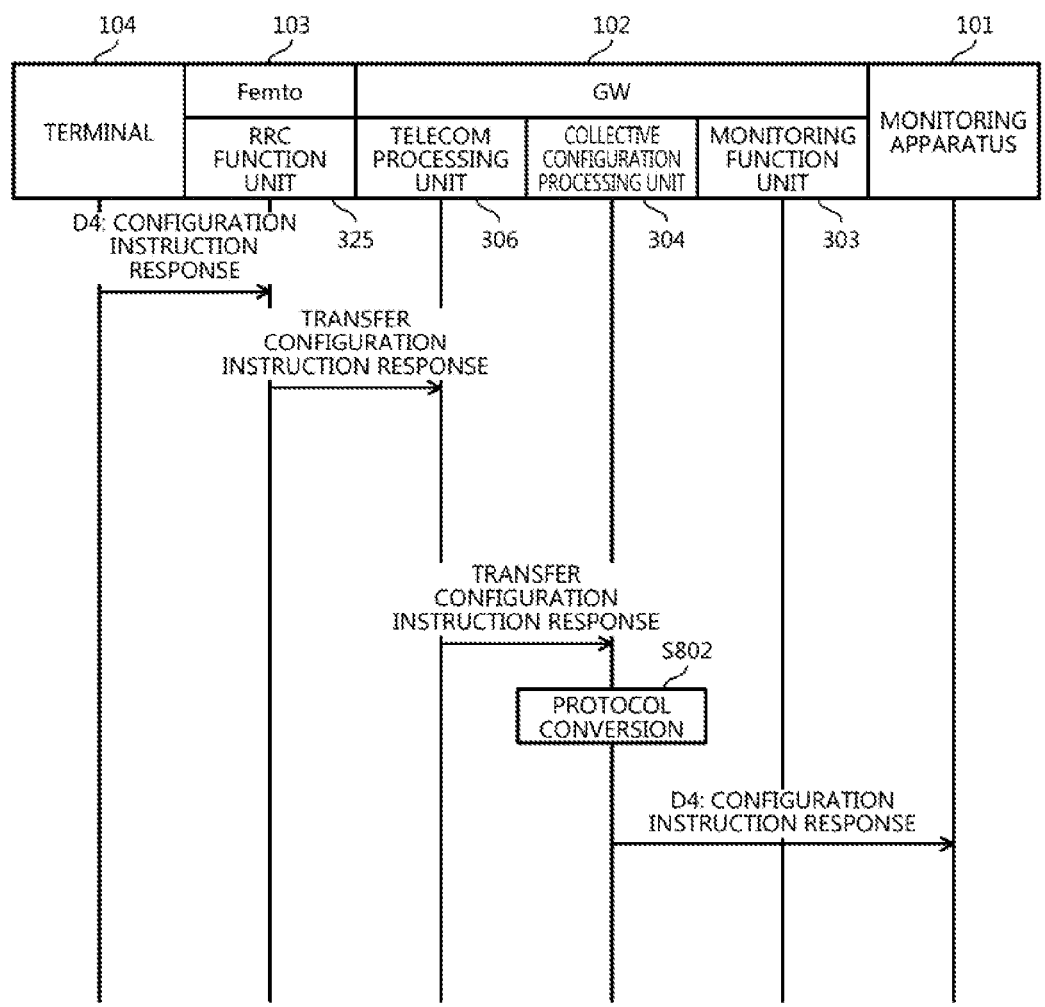

FIG.9A

| PRE-CONVERSION MESSAGE EXAMPLE | | 931 |
|---|---|---|
| COLLECTIVE CONFIGU-RATION CONTENTS | CONTENTS EXAMPLE | |
| SetParameterValues | Command, TAC<br>TAC, 23456<br>HeNB Group, 18460 | |

⇑

| POST-CONVERSION MESSAGE EXAMPLE | | 932 |
|---|---|---|
| Information Element | MESSAGE CONTENTS EXAMPLE | |
| Message Type | 67 | |
| Message Identifier | 4650 | |
| Serial Number | 21456 | |
| Warning Message Contents | 001, 004, 002, 23456, 003, 18460 | |

CONVERT CONTENTS OF Set Parameter Values OF PRE-CONVERSION MESSAGE EXAMPLE TO Warning Message Contents

FIG.9B

| PRE-CONVERSION MESSAGE EXAMPLE | | 933 |
|---|---|---|
| Information Element | MESSAGE CONTENTS EXAMPLE | |
| Message Type | 67 | |
| Message Identifier | 4650 | |
| Serial Number | 21456 | |
| Emergency Area IDBroadcast | 001, 004, 002, 23456, 003, 18460, 004, 001 | |

⇓

| POST-CONVERSION MESSAGE EXAMPLE | | 934 |
|---|---|---|
| COLLECTIVE CONFIGU-RATION CONTENTS | CONTENTS EXAMPLE | |
| Inform | Command, TAC<br>TAC, 23456<br>HeNB Group, 18460<br>Status, 001 | |

CONVERT PRE-CONVERSION Emergency Area ID Broadcast CONTENTS (CONFIGURATION SUCCESSFUL: 001) TO Inform

FIG.10

Femto GROUP EXAMPLE

|     | Femto GROUP TYPE | Femto DETERMINING APPARATUS |
| --- | --- | --- |
| (1) | Femto GROUP BUNDLED BY GWs | GW |
| (2) | Emergency Area (EA) ID GROUP | Femto |
| (3) | Tracking Area (TA) ID GROUP | GW, Femto |

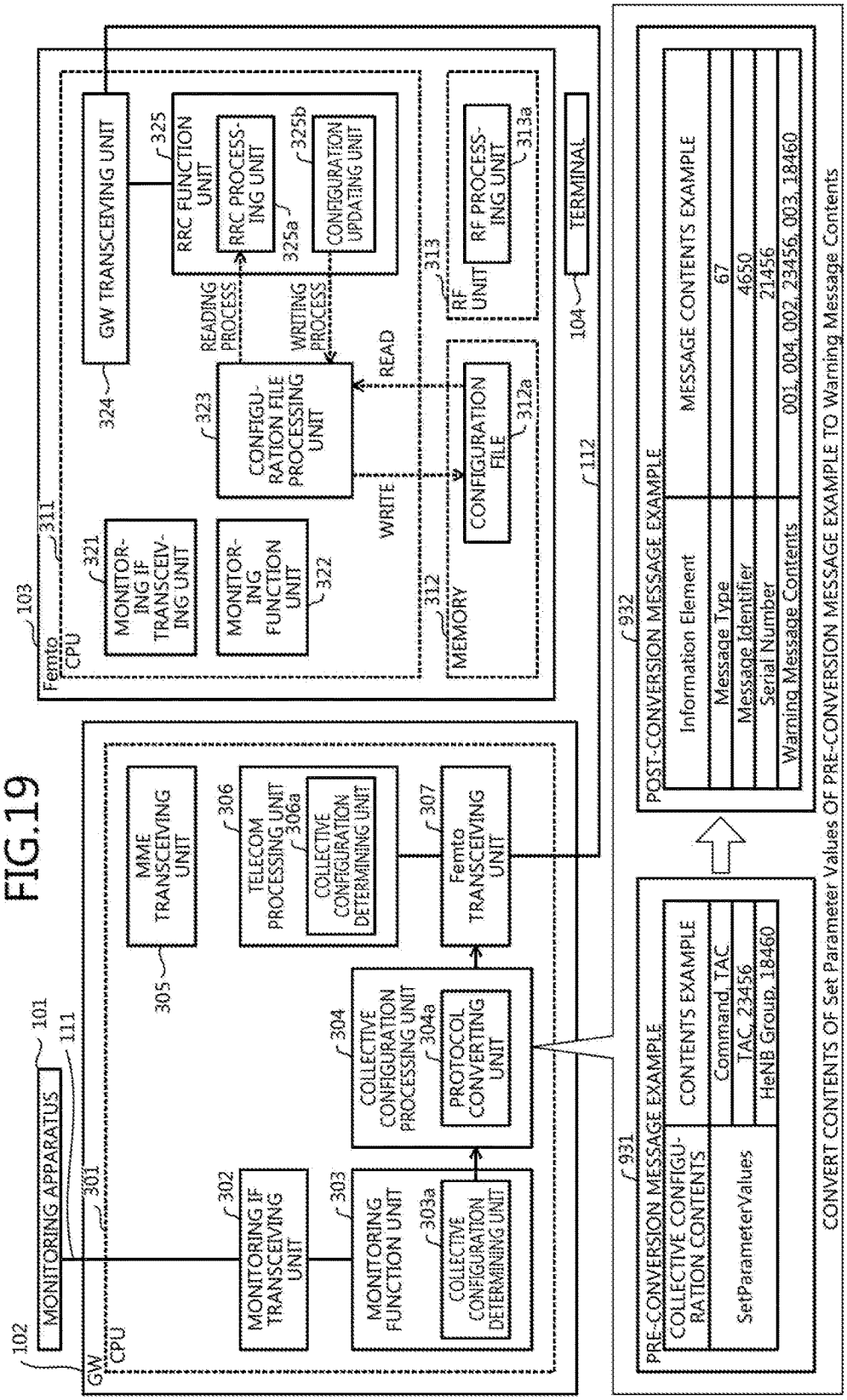

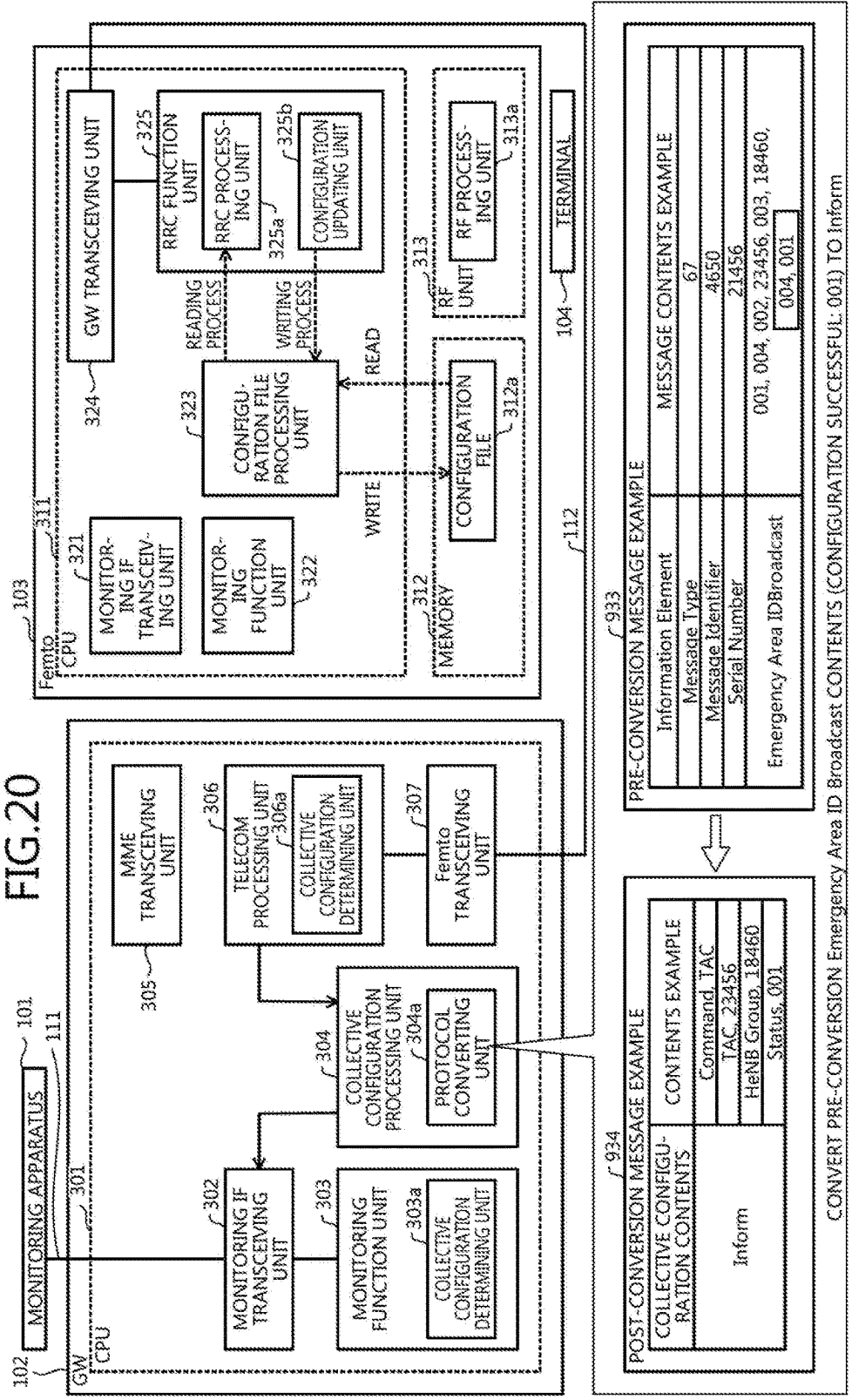

FIG.21

TR069: ACB CONTROL INFORMATION

| ITEM | ITEM CONTENTS |
|---|---|
| CellBarred | REGULATION CONTROL ON/OFF |
| BarringForEmergency | Access Class 10 FLAG |
| BarringForMO-SignalingONOFF | SIGNAL REGULATION ON/OFF |
| BarringForMO-Signaling-BarringFactor | SIGNAL REGULATION FACTOR |
| BarringForMO-Signaling-BarringTime | SIGNAL REGULATION TIME |
| BarringForMO-Signaling-BarringForSpecialAC | SIGNAL REGULATION FOR SPECIFIED CALL |
| BarringForMO-DataONOFF | DATA REGULATION ON/OFF |
| BarringForMO-Data-BarringFactor | DATA REGULATION FACTOR |
| BarringForMO-Data-BarringTime | DATA REGULATION TIME |
| BarringForMO-Data-BarringForSpecialAC | DATA REGULATION FOR SPECIFIED CALL |
| ssac-BarringForMMTEL-Voice-r9ONOFF | VOICE COMMUNICATION REGULATION ON/OFF |
| ssac-BarringForMMTEL-Voice-r9-BarringFactor | VOICE COMMUNICATION REGULATION FACTOR |
| ssac-BarringForMMTEL-Voice-r9-BarringTime | VOICE COMMUNICATION REGULATION TIME |
| ssac-BarringForMMTEL-Voice-r9-BarringForSpecialAC | VOICE COMMUNICATION REGULATION FOR SPECIFIED CALL |
| ssac-BarringForMMTEL-Video-r9ONOFF | VIDEO COMMUNICATION REGULATION ON/OFF |
| ssac-BarringForMMTEL-Video-r9-BarringFactor | VIDEO COMMUNICATION REGULATION FACTOR |
| ssac-BarringForMMTEL-Video-r9-BarringTime | VIDEO COMMUNICATION REGULATION TIME |
| ssac-BarringForMMTEL-Video-r9-BarringForSpecialAC | VIDEO COMMUNICATION REGULATION FOR SPECIFIED CALL |

FIG.22

S1AP: WRITE- REPLACE WARNING REQUEST

| IE | NORMAL USAGE | USAGE IN EMBODIMENT (COLLECTIVE CALL REGULATION) |
|---|---|---|
| Message Type | SI MESSAGE IDENTIFIER | SI MESSAGE IDENTIFIER |
| Message Identifier | CONFIGURE IDENTIFIER OF Warning MESSAGE (ETWS, CMAS) | CONFIGURE SPECIAL RESERVED VALUE (VALUE NOT USED IN NORMAL ETWS, CMAS) |
| Serial Number | | |
| Warning Message Contents | NOTIFICATION INFORMATION OF WARNING, ANNOUNCEMENT | INFORMATION NECESSARY IN ACB CONFIGURATION |

FIG.23

S1AP: WRITE- REPLACE WARNING RESPONSE

| IE | NORMAL USAGE | USAGE IN EMBODIMENT (COLLECTIVE CALL REGULATION) |
|---|---|---|
| Message Type | SI MESSAGE IDENTIFIER | SI MESSAGE IDENTIFIER |
| Message Identifier | CONFIGURE IDENTIFIER OF Warning MESSAGE (ETWS, CMAS) | CONFIGURE SAME VALUE AS VALUE RECEIVED BY S1AP:WRITE- REPLACE WARNING REQUEST |
| Serial Number | | |
| Broadcast Completed Area List | AREA NOTIFIED OF WARNING, ANNOUNCEMENT | CONFIGURE eNB ID OF OWN Femto |

FIG.24

S1AP: WRITE- REPLACE WARNING REQUEST

| IE | NORMAL USAGE | USAGE IN COLLECTIVE CALL REGULATION |
|---|---|---|
| Message Type | SI MESSAGE IDENTIFIER | NORMAL USAGE |
| Message Identifier | CONFIGURE IDENTIFIER OF Warning MESSAGE (ETWS, CMAS) | NORMAL USAGE |
| Serial Number | | |
| Warning Message Contents | NOTIFICATION INFORMATION OF WARNING, ANNOUNCEMENT | NORMAL USAGE |
| ACB Info | - | ACB REGULATION INFORMATION |

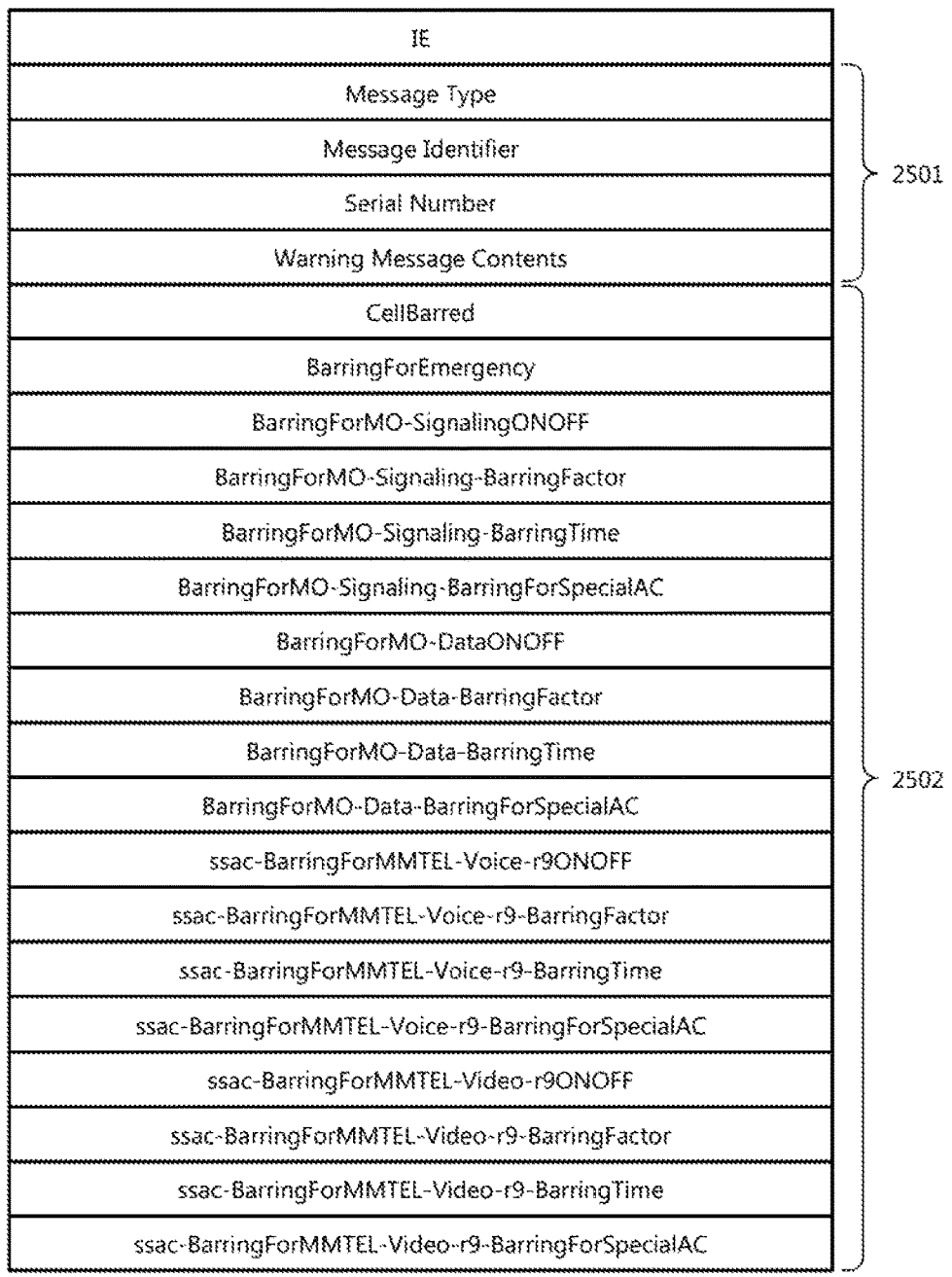

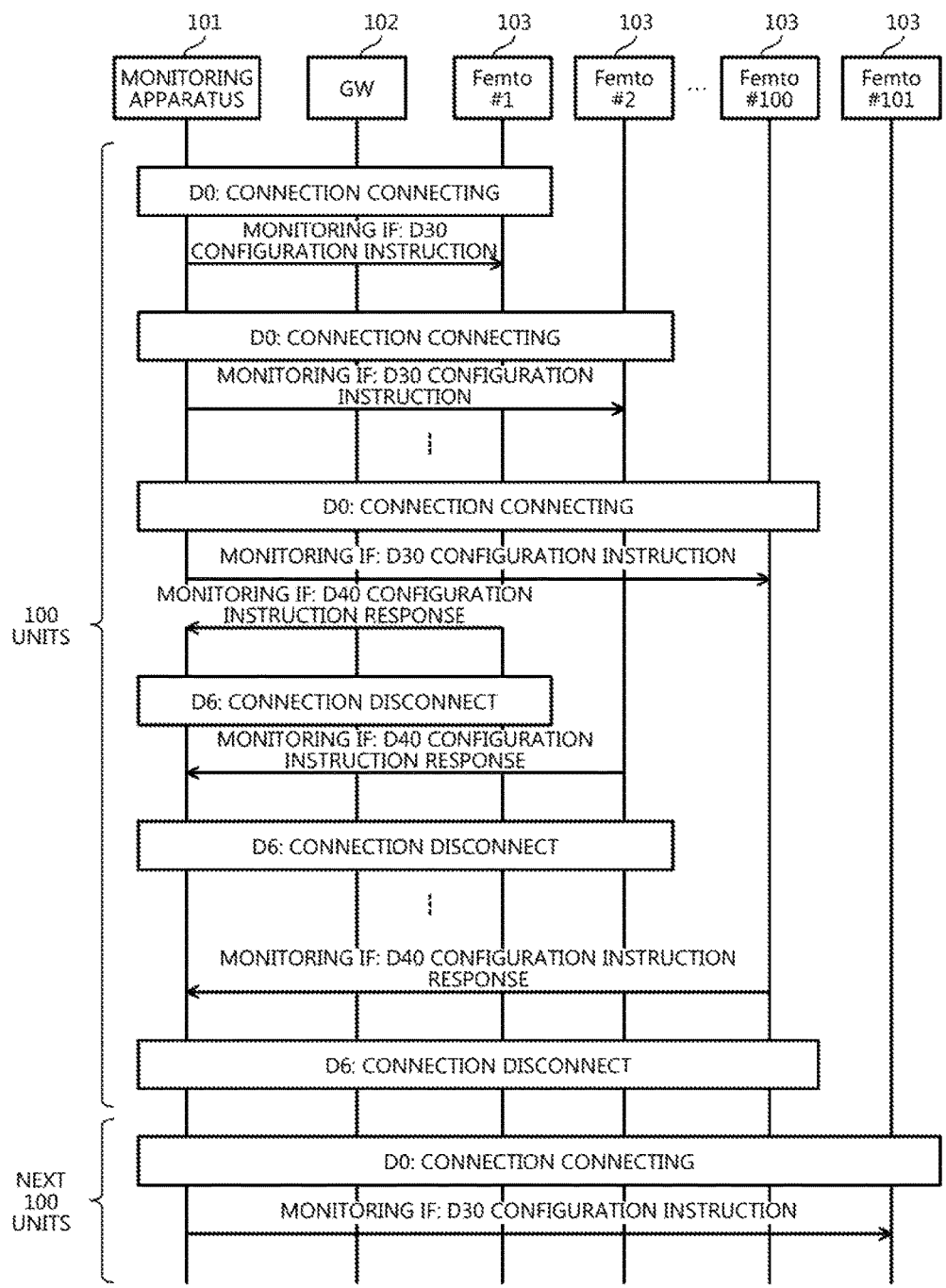

GATEWAY APPARATUS AND COMMUNICATIONS SYSTEM

CROSS REFERENCE TO RELATED APPLICATIONS

This application is a continuation application of International Application PCT/JP2014/059580, filed on Mar. 31, 2014, and designating the U.S., the entire contents of which are incorporated herein by reference.

FIELD

The embodiments discussed herein are related to a gateway apparatus and communications system that perform configuration for plural base stations.

BACKGROUND

Numerous femtocells, which are small-scale base stations, are installed and configuration of communication regulations for communication with mobile stations is performed for the femtocells using configuration information. A monitoring apparatus controls communication of each of these base stations through a monitoring I/F and after the monitoring apparatus connects to each base station, configuration information is transmitted, enabling monitoring configuration to be performed. Further, the plural base stations are continuously connected to a gateway apparatus through a call control I/F and are capable of performing call control communication.

Conventionally, a service bearer is configured for each access point between a mobile station and gateway apparatus and communication regulation is performed. according to the service bearer type (for example, refer to Japanese Laid-Open Patent Publication No. 2012-119826). Further, to prevent network (base station) overload, Access Class Barring (ACB) information is used as configuration information for access regulation to perform terminal communication regulation (for example, refer to Published. Japanese-Translation of POT Application, Publication. No. 2013-536636). Further, for a specific service, ACB information is used to give notification to terminals by a broadcast message and perform communication regulation (for example, refer to Published Japanese-Translation of PCT Application, Publication No. 2012-529806).

SUMMARY

According to one aspect of the present invention, a gateway apparatus includes a first inter-device interface configured to communicate with a monitoring apparatus; a second inter-device interface configured to communicate with plural base station apparatuses that are subordinate; and a processor configured to generate second configuration information by a protocol conversion of converting first configuration information to a format compatible with the second inter-device interface, when the first configuration information is received from the monitoring apparatus through the first inter-device interface, the processor further configured to transmit the generated second configuration information to the plural base station apparatuses through the second inter-device interface.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a or diagram depicting configuration related to transmission of a configuration instruction response from the base stations to the GW;

FIG. 7 is a flowchart of processing contents related to a configuration instruction response from the base stations to the GW;

FIG. 8 is a sequence diagram depicting processing contents related to a configuration instruction response;

FIGS. 9A and 9B are other examples of protocol conversion performed by a protocol converting unit;

FIG. 10 is a chart depicting target femto determining units according to femto group type;

FIG. 19 is a block diagram depicting an example of configuration of the base stations and the GW according to a fourth embodiment;

FIG. 20 is a block diagram of configuration related to transmission of a configuration instruction response from the base station according to the fourth embodiment to the GW;

FIG. 21 is a chart depicting list of item contents and parameters of ACB regulation information used by TR069 IF as a monitoring IF;

FIG. 22 is a chart depicting an example of mapping of a collective configuration request to a S1 message by the GM;

FIG. 23 is a chart depicting a mapping example of a configuration request response using a S1 message from the base stations to the GW;

FIG. 24 is a chart depicting another example of mapping a collective configuration request to a S1 message by the GW;

FIG. 25 is a chart depicting a S1 message example by the GW;

FIG. 27 is a sequence diagram depicting a procedure of a configuration instruction for a base station by an existing scheme.

DESCRIPTION OF THE INVENTION

Embodiments of the disclosed technique will be described in detail with reference to the accompanying drawings. In a first embodiment, overall configuration of a communications system will be described.

Figure 1:
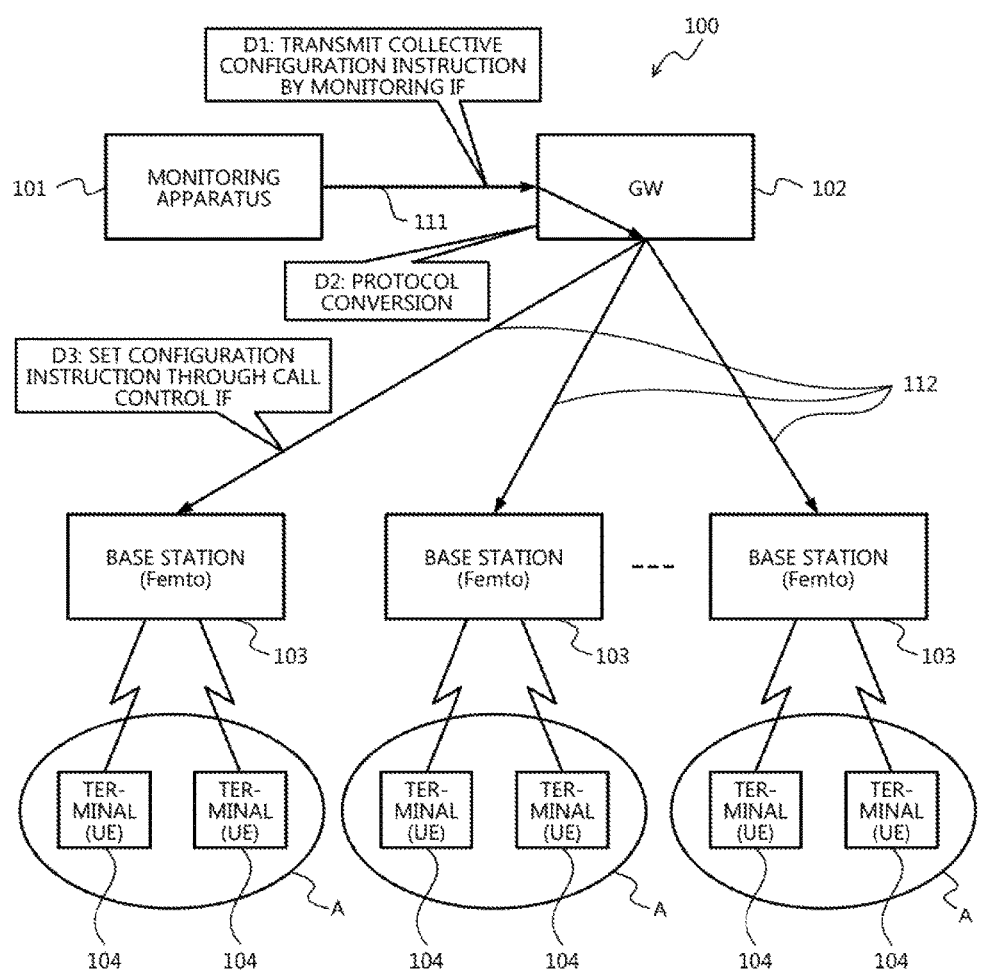
FIG. 1 is a block diagram depicting overall configuration of a communications system including a gateway apparatus according to a first embodiment.

FIG. 1 is a block diagram depicting overall configuration of a communications system including a gateway apparatus according to the first embodiment. A communications system 100 includes a monitoring apparatus 101, a gateway apparatus (GW) 102, small-scale base station apparatuses (hereinafter, base stations, femtos) 103, and terminals (UE) 104 present in communication areas A of the base stations 103.

Although not depicted in FIG. 1, in the overall configuration of the communications system, a higher level apparatus of the gateway apparatus 102 may be included. A higher level apparatus of the gateway apparatus 102, for example, may be a mobility management entity (MME), a serving-gateway (S-GW), etc.

The monitoring apparatus 101 uses a monitoring IF 111, which is a first inter-device interface, to transmit to the GW 102, a collective configuration instruction D1 for the base stations 103 monitored by the monitoring apparatus 101. The collective configuration instruction D1, for example, includes a communication regulation notification message for all of the base stations 103 monitored by the monitoring apparatus 101.

The monitoring apparatus 101 performs a connection connecting process (connection starting and disconnecting) for the GW 103, by the monitoring IF 111 for communication with the GW 102. Among all of the GWs 102 monitored by the monitoring apparatus 101, a portion of the GWs 102 may be specified as a group, or an area may be specified for transmission of the collective configuration instruction D1.

When receiving a collective configuration instruction (configuration information) D1 from the monitoring apparatus 101, the GW 102 converts a notification regulation message included in the collective configuration instruction D1 into a call control protocol (process D2 of the GW 102). Through a call control IF 112, which is a second inter-device interface, the GW 102 sets in all of the base stations 103, a configuration instruction (configuration information) D3 that includes the communication regulation message converted according to the converted call control protocol.

The GW 102 and the base stations 103, for example, are continuously connected through an S1 interface as the call control IF 112, and exchange S1 messages. As a result, the monitoring apparatus 101 may set a message of the configuration instruction D3 for communication regulation in all of the base stations 103 through the GW 102 by transmitting the collective configuration instruction D1 once.

The base stations 103 ultimately notify the UEs 104 of the communication regulation message, enabling communication regulation to be performed between the base stations 103 and the UEs 104.

Figure 2:
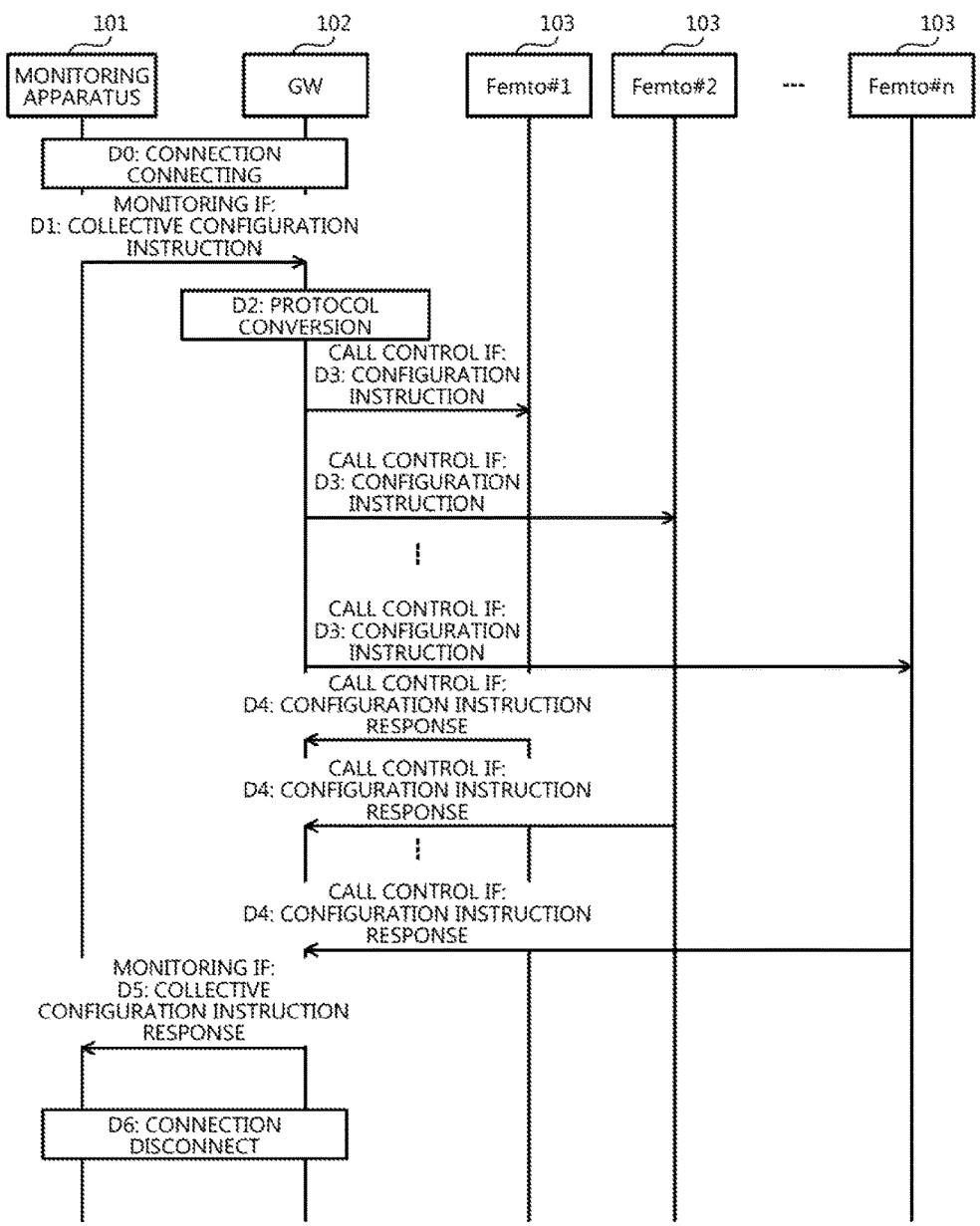
FIG. 2 is a sequence diagram depicting a process outline of the overall communications system including the gateway apparatus according to the first embodiment.

FIG. 2 is a sequence diagram depicting a process outline of the overall communications system including the gateway apparatus according to the first embodiment. The exchange of information between the monitoring apparatus 101, the GW 102, and the base stations 103 will be described with reference to this figure.

The monitoring apparatus 101 performs a connection connecting process D0 (connection start) with the GW 102 through the monitoring IF 111. The monitoring apparatus 101 specifies the base stations 103 to be collectively configured and transmits the collective configuration instruction D1. The GW 102 receives the collective configuration instruction D1 from the monitoring apparatus 101 and transmits through the call control IF 112, the configuration instruction D3 to each of the base stations 103 of a group indicated in the collective configuration instruction D1 and to be collectively configured.

The monitoring apparatus 101 does not have the call control IF 112 and transmits the collective configuration instruction D1 to the GW 102 having the call control IF 112. The GW 102 transmits the configuration instruction D3 to the base stations 103 that are to be collectively configured.

The base stations 103 that receive the configuration instruction from the GW 102, each transmits to the GW 102 through the call control IF 112, a configuration instruction response D4 as response information indicating a configuration state based on the configuration instruction D3, after completing configuration based on the configuration instruction D3. Here, the base stations 103 may transmit the configuration instruction D3 to the terminals 104 and the terminals 104 may determine whether communication configuration is to be performed based the configuration instruction D3. In this case, the base stations 103 use a determination result (perform/do not perform configuration, or configuration successful/failed) by the terminals 104 as the configuration instruction response D4. The base stations 103 transmit to the GW 102, each configuration instruction response D4 at the time completion of configuration based on the configuration instruction D3.

At the time when configuration instruction responses D4 have been received from all the base stations 103 to be collectively configured or at the time when a collective-configuration response waiting timer of the GW 102 has elapsed, the GW 102 collects the configuration instruction responses D4 and generates one collective configuration instruction response D5. The GW 102 transmits the collective configuration instruction response D5 to the monitoring apparatus 101, through the monitoring IF 111. Thereafter, the monitoring apparatus 101 performs a connection disconnection process D6 (connection disconnect) with the GW 102 by the monitoring IF 111 and ends a series of operations related to collective configuration.

In the processes above, the monitoring apparatus 101 is able to perform collective configuration for communication regulation, etc. with respect to the base stations by performing a connection process (connection start D0 and connection disconnection D6 once with the GW 102.

Figure 3:
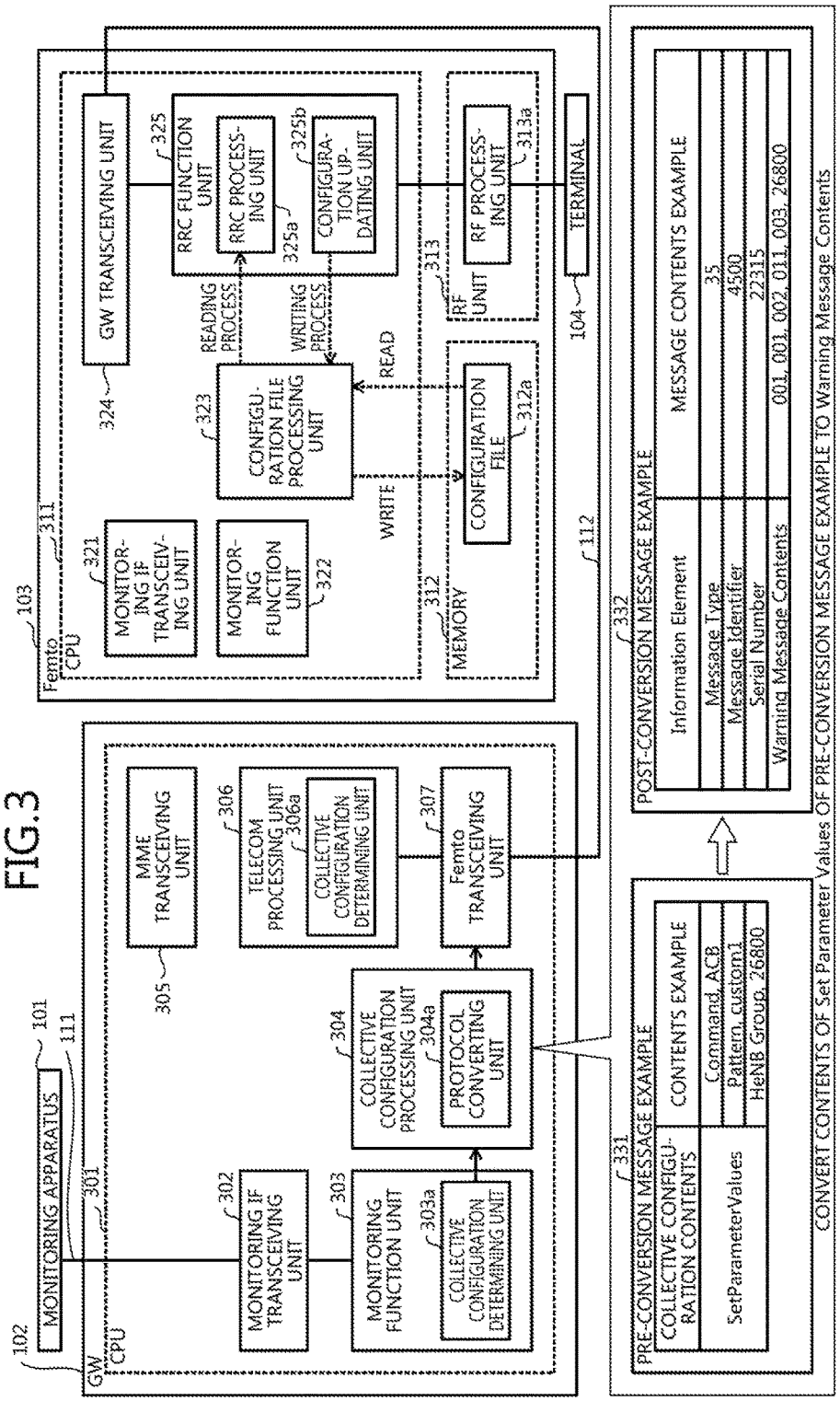
FIG. 3 is a block diagram of a configuration related to configuration instruction transmission from a GW to a base station.

FIG. 3 is a block diagram of a configuration related to configuration instruction transmission from the GW to a base station. Configuration related to a collective configuration instruction from the GW 102 to the base stations 103 will be described with reference to FIG. 3. Hereinafter, description will be given using an example where the base stations 103 are femtos. The femtos 103 of a target group and that have received the collective configuration instruction D1 (the configuration instruction D3) perform communication regulation for communication with the terminals 104.

At the monitoring apparatus 101 and the GW 102, the defining and sharing of messages to be transmitted (the collective configuration instruction D1, etc.) are performed in advance.

The GW 102 has a CPU 301 and non-depicted memory (ROM, RAM, etc.). Programs stored by the ROM are executed by the CPU 301 whereby, operation of the GW 102 is controlled. Here, the RAM is used as a data area for processing work.

The GW 102 includes a monitoring IF transceiving unit 302, a monitoring function unit 303, a collective configuration processing unit 304, an MME transceiving unit 305, a telecom processing unit 306, and a femto transceiving unit 307. The monitoring IF transceiving unit 302 is an IF performing transmission and reception with the monitoring apparatus 101, through the monitoring IF 111. The telecom processing unit 305 includes a collective configuration determining unit 306a.

The monitoring function unit 303 includes a collective configuration determining unit 303a that determines whether the monitoring IF transceiving unit 302 has received the collective configuration instruction D1 from the monitoring apparatus 101. The collective configuration determining unit 303a determines whether a received message is an existing message using the monitoring IF 111 or a message for collective configuration (the collective configuration instruction D1). The collective configuration determining unit 303a outputs the collective configuration instruction D1 to the collective configuration processing unit 304.

The collective configuration processing unit 304 includes a protocol converting unit 304a that converts the collective configuration instruction D1 received through the monitoring IF 111, into a message used by the call control IF 112. The configuration instruction D3 for the base stations 103 is generated and output to the femto transceiving unit 307 by the protocol conversion via the protocol converting unit 304a.

The protocol converting unit 304a converts the collective configuration instruction D1 into a message for Tracking Area Code (TAC) conversion or communication regulation information (ACB) between the femtos 103 and the general-purpose terminals 104 and used by the call control IF 112.

The femto transceiving unit 307 transmits the configuration instruction D3 that has been protocol-converted, to the femtos 103 of the group to be collectively configured, through the call control IF 112.

The collective configuration instruction D1 may be received from a higher-level core node such as the MME, etc. connected to the GW 102, or the collective configuration instruction D1 may be received through the MME transceiving unit 305.

The base station (femto) 103 includes a control unit (CPU) 311, memory 312, and an RE unit 313. The CPU 311 has non-depicted ROM and RAM. Programs stored in the ROM are executed by the CPU 311 whereby, operation of the femtos 103 is controlled. Here, the RAM is used as a data area for processing work.

The CPU 311 includes a monitoring IF transceiving unit 321, a monitoring function unit 322, a configuration file processing unit 323, a GW transceiving unit 324, and a RRC function unit 325. The monitoring IF transceiving unit 321 and the monitoring function unit 322 perform a process related to an existing monitoring process transmitted from the monitoring apparatus 101 (not involved in the collective configuration process in the present embodiment).

The GW transceiving unit 324 receives the configuration instruction D3 from the GW 102 (the femto transceiving unit 307), through the call control IF 112 and outputs the configuration instruction D3 to the RRC function unit 325.

The RRC (Radio Resource Control) function unit 325 includes an RRC processing unit 325a and a configuration updating unit 325b. The configuration updating unit 325b writes configuration contents of the configuration instruction D3 received from the GW 102 into a configuration file 312a of the memory 312. The RRC processing unit 325a reads the configuration file 312a, creates a transmission message to the terminals 104, and transmits the transmission message through an RF processing unit 313a of the RF unit 313.

Based on the message to the terminals 104 (corresponds to the collective configuration instruction D1 of the monitoring apparatus 101), the terminals 104 perform communication regulation for communication with the femtos 103.

In FIG. 3, an example of protocol conversion performed by the protocol converting unit 304a is also depicted. A pre-conversion message example 331 is a message of the collective configuration instruction D1 used in the protocol for the monitoring IF 111. A post-conversion message example 332 is a message of the configuration instruction D3 used in the protocol for the call control IF 112. Contents of Set Parameter Values of the pre-conversion message example 331 are converted to Warning Message Contents of the post-conversion message example 332.

In the example, 3 parameters (collective conversion contents, target area information, configuration pattern) of the communication regulation indicated by the collective configuration instruction D1 are stored to the Warning Message Contents of the post-conversion message example 332. In the parameter conversion, Command and ACB information indicating collective conversion contents of a pre-conversion message (the collective configuration instruction D1) are converted to 001, 001. Further, Pattern, custom1 indicating a configuration pattern are converted to 002, 011. A HeNE Group, 26800 indicating target area information is converted to 003, 26800.

Figure 4:
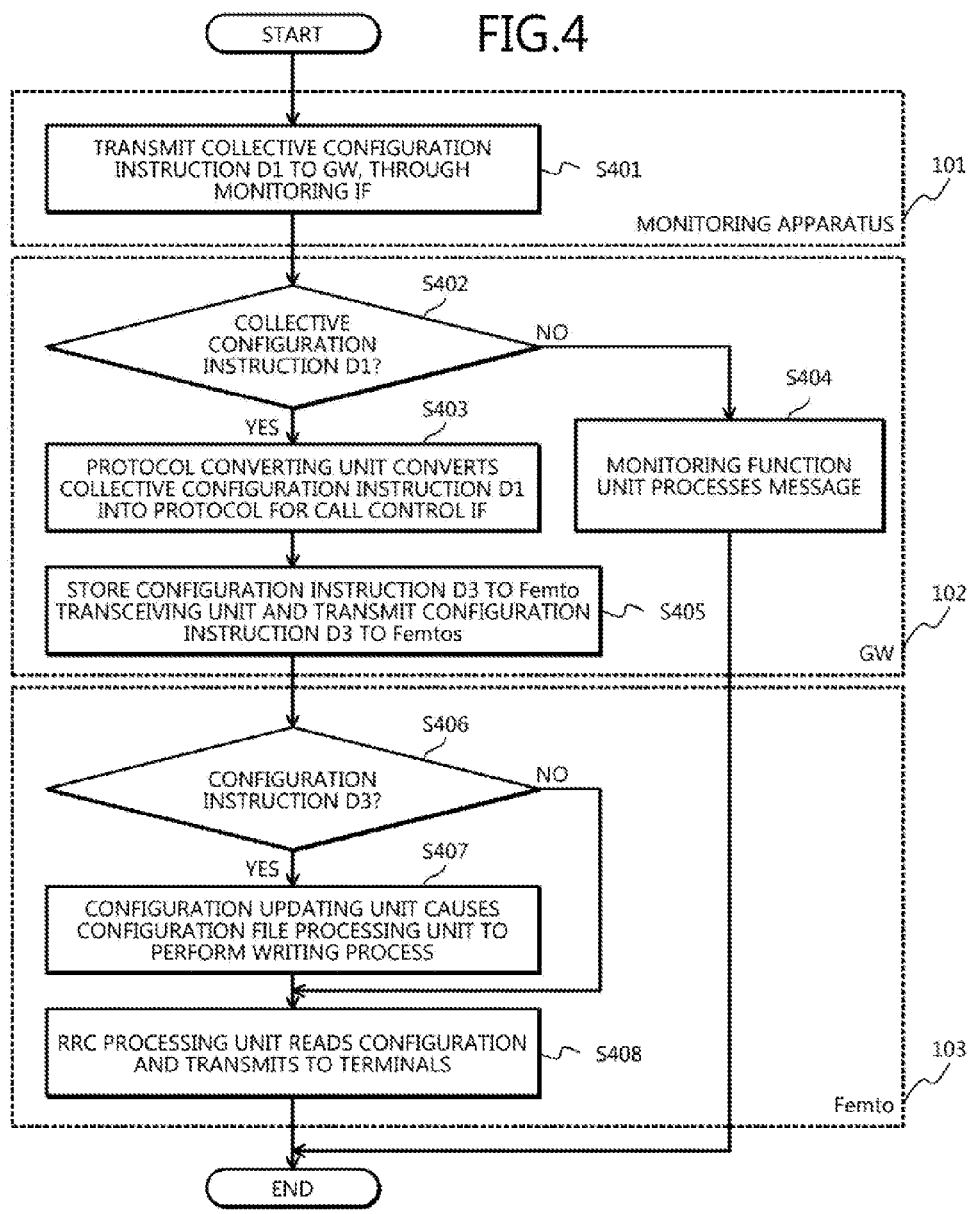
FIG. 4 is a flowchart of processing contents related to a collective configuration instruction to base stations from a monitoring apparatus, through the GW.

FIG. 4 is a flowchart of processing contents related to a collective configuration instruction to the base stations from the monitoring apparatus, through the GW. The monitoring apparatus 101 transmits the collective configuration instruction D1 to the GW 102, through the monitoring IF 111 (step S401).

The GW 102 determines whether the collective configuration instruction D1 has been received from the monitoring apparatus 101 (step S402). If the collective configuration instruction D1 has been received (step S402: YES), the GW 102 converts, by the protocol converting unit 304a, the collective configuration instruction D1 of the protocol for the monitoring IF 111 into the protocol for the call control IF 112 (step S403). On the other hand, at step S402, when a message other than the collective configuration instruction D1 is received (step S402: NO), the GW 102 performs an existing message process by the monitoring function unit 303 (step S404), and ends the process.

After step S403, the GW 102 stores the configuration instruction D3 to the femto transceiving unit 307 and transmits a message of the configuration instruction D3 no the femtos 103 (step S405).

The femtos 103 determine whether the configuration instruction D3 has been received (step S406). For example, the femtos 103, at a communications interface for the network side, determine whether the reception signal is the configuration instruction D3 in response to detection of a reception signal from an apparatus such as the GW 102 and thereby, determine whether toe configuration instruction D3 has been received.

If the femtos 103 have received the configuration instruction D3 (step S406: YES), the configuration updating unit 325b causes the configuration file processing unit 323 to perform a writing process for configuration concerning the configuration instruction D3 (step S407), and transitions to step S408. As a result, the configuration instruction D3 is written to the configuration file 312a. On the other hand, at the communications interface for the network side, if the detected reception signal from an apparatus such as the GW 102 is not the configuration instruction D3 and, for example, is the S1 message from the MME, the femtos 103 determine that the configuration instruction D3 has not been received (step S406: NO), and transition to step S408.

Thereafter, at step S408, in response to the arrival of a predetermined transmission timing, the RRC processing unit 325a, by the configuration file processing unit 323, transmits to the terminals 104, control information based on the contents read from the configuration file 312a (step S408). As a result, when the configuration instruction D3 has been written to the configuration file 312a, the contents indicated by the configuration instruction D3, for example, control information based on configuration of the communication regulation is transmitted to the terminals 103 (step S408).

Figure 5:
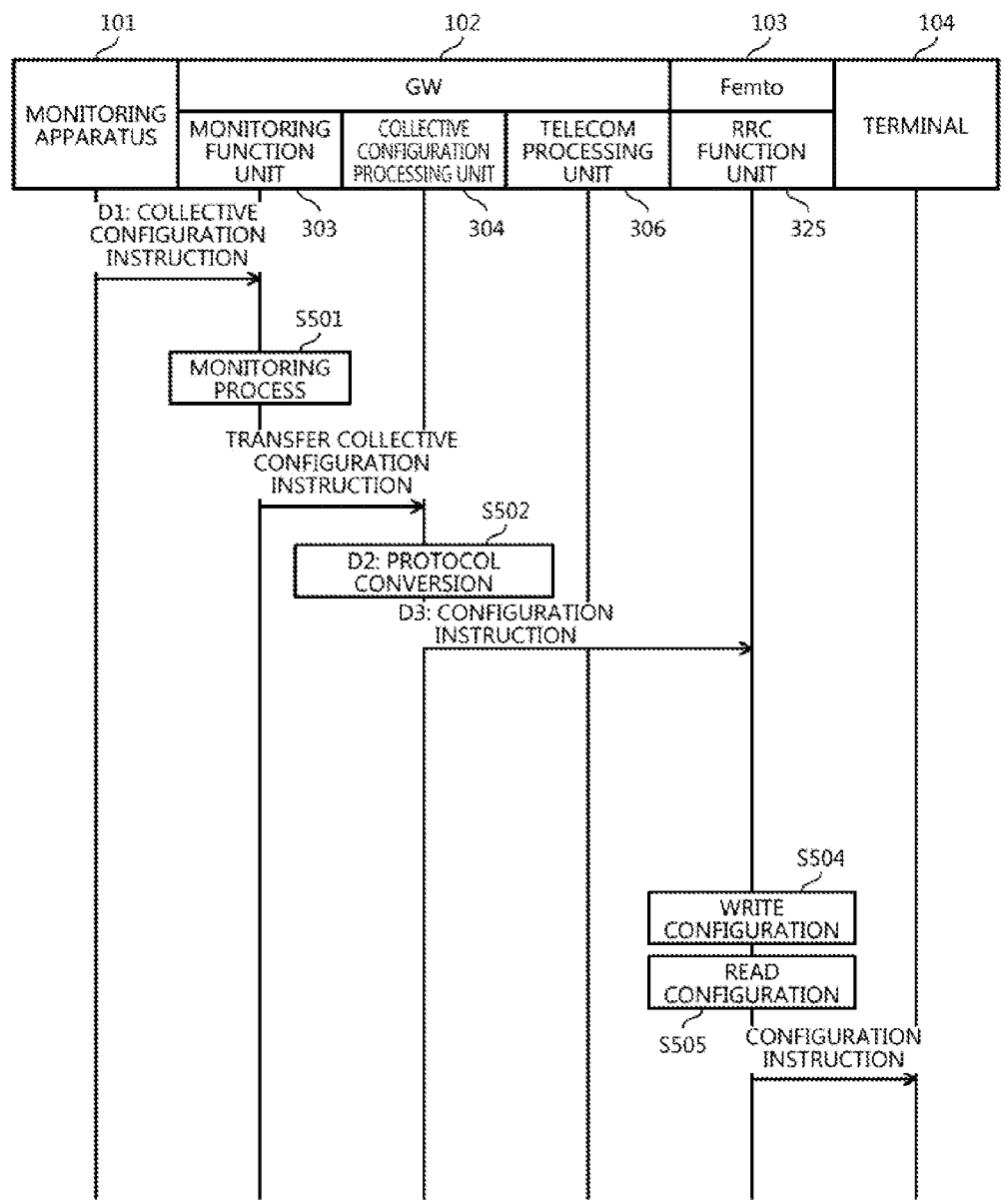
FIG. 5 is a sequence diagram depicting processing contents related to the collective configuration instruction.

FIG. 5 is a sequence diagram depicting processing contents related to the collective configuration instruction. The collective configuration instruction D1 transmitted from the monitoring apparatus 101 is received by the monitoring function unit 303 of the GW 102 and the monitoring function unit 303 performs a monitoring process (step S501). In the case of the collective configuration instruction D1, the monitoring function unit 303 transfers the collective configuration instruction D1 to the collective configuration processing unit 304 and the collective configuration processing unit 304 performs the protocol conversion process D2 (step S502).

The RRC function unit 325 writes the configuration instruction D3 into the configuration file 312a, by the configuration file processing unit 323 (step S504). The RRC function unit 325 reads the configuration file 312a, by the configuration file processing unit 323 (step S505), and transmits a configuration instruction including communication regulation to the terminals 104.

FIG. 6 is a block diagram depicting configuration related to transmission of a configuration instruction response from the base stations to the GW. Configuration related to the configuration instruction response D4 from the base stations 103 to the GW 102 will be described with reference to FIG. 6. The femtos 103 of the target group and that have received the configuration instruction D3 perform communication regulation with the terminals 104.

The femtos 103 that have finished collective configuration processing transmit the configuration instruction response D4 to the GW 102. This is for the femtos 103 to separate the processing from existing message processing using the monitoring IF 111 performed with the monitoring apparatus 101. The femtos 103 that have generated a message of the configuration instruction response D4 store the message of the configuration instruction response D4 to the GW transceiving unit 324 and transmit the message to the GW 102. Here, a parameter of configuration success or configuration failure is configured as the message contents of the configuration instruction response D4.

The GW 102 outputs the configuration instruction response. D4 received from the femtos 103 by the femto transceiving unit 307 to the collective configuration determining unit 306a of the telecom processing unit 306. The collective configuration determining unit 306a outputs the configuration instruction response D4 to the collective configuration processing unit 304 and the protocol converting unit 304a performs protocol conversion of the monitoring IF 111. At the collective configuration determining unit 306a, a S1 message for the MME and the message of the configuration instruction response D4 are distinguished. The configuration instruction response DA subjected to protocol conversion is stored to the monitoring IF transceiving unit 302 and transmitted to the monitoring apparatus 101, through the monitoring IF 111.

In FIG. 6, a protocol conversion example performed by the protocol converting unit 304a is also depicted. A pre-conversion message example 631 is a message used in the protocol for the call control IF 112 and a post-conversion message example 632 is a message used in the protocol for the monitoring IF 111. In this example, the femtos 103 that have changed configuration retain the parameters of the post-conversion message example 332 depicted in FIG. 3 and generate the pre-conversion message 631. Here, the parameters of Warning Message Contents of the post-conversion message example 332 in FIG. 3 are stored to Emergency Area (EA) ID.

As depicted in FIG. 6, when configuration is successful, 004, 001 are newly stored to EAID (when configuration fails, 004, 000 are stored) as the pre-conversion message 631 of the configuration instruction response D4. The GW 102 performs protocol conversion of the pre-conversion message 631 and generates the post-conversion message 632 of the configuration instruction response D4. Here, the parameter of EAID of pre-conversion message 631 is converted to Inform of the post-conversion message 632.

In the post-conversion message 632, when all of the femtos 103 indicated in units of HeNB Groups by the target area information have successfully performed configuration, Status of Inform is newly added and 001 is stored. When configuration has failed, 000 is stored. Alternatively, the number of the femtos 103 succeeding and failing to perform configuration may be stored.

FIG. 7 is a flowchart of processing contents related to a configuration instruction response from the base stations to the GW. The RRC function unit 325 of the femtos 103 stores the configuration instruction response D4 to the GW transceiving unit 324 and transmits the configuration instruction response D4 to the GM 102 (step S701).

The GW 102 determines whether the received message is the configuration instruction response D4 for the configuration instruction D3 previously transmitted (step S702). Here, at the collective configuration determining unit 306a, the GW 102 distinguishes whether the received message is a S1 message transmitted to the MME or the message of the configuration instruction response D4 transmitted to the monitoring apparatus 101. When the configuration instruction response D4 is received (step S702: YES), the configuration instruction response D4 of the protocol for the call control IF 112 is converted to the protocol for the monitoring IF 111 by the protocol converting unit 304a (step S703). When the received message is not the configuration instruction response D4 (step S702: NO), the message is processed by the telecom processing unit 306 (step S704), ending the processing of the flowchart.

After step S703, the GW 102 stores the configuration instruction response D4 to the monitoring IF transceiving unit 302 and transmits the configuration instruction response D4 to the monitoring apparatus 101 through the monitoring IF 111 (step S705), ending the processing of the flowchart.

FIG. 8 is a sequence diagram depicting processing contents related to a configuration instruction response. The terminals 104 execute a process of communication regulation corresponding to the configuration instruction D3 and transmit the configuration instruction response D4 to the femtos 103. The femtos 103 transfer the configuration instruction response D4 from the terminals 104 to the GW 102.

The telecom processing unit 306 of the GM 102 transfers the configuration instruction response D4 to the collective configuration processing unit 304. The collective configuration processing unit 304 converts the configuration instruction response D4 of the protocol for the call control IF to the protocol for the monitoring IF (step S802). The configuration instruction response D4 after protocol conversion is transmitted to the monitoring apparatus 101 through the monitoring IF transceiving unit 302 of the GW 102.

FIGS. 9A and 9B are other examples or protocol conversion performed by the protocol converting unit. FIG. 9A depicts a conversion message of the collective configuration instruction D1 when transmitted to the femtos 103 from the GW 102. The contents of Set Parameter Values of a pre-conversion message 931 are converted to Warning Message Contents of a post-conversion message 932.

In this example, a case where the TACs of a femto group 103 of a given area is changed simultaneously is depicted. The 3 parameters (collective conversion contents, target area information, configuration pattern) of the communication regulation indicated by the collective configuration instruction D1 are stored to Warning Message Contents of the post-conversion message 932. In this parameter conversion, Command and TAC information indicated by the collective conversion contents of the pre-conversion message (the collective configuration instruction D1) are converted to 001, 004. Further, TAC, 23456 indicated by the configuration pattern are converted to 002, 23456. The HeNB Croup, 18460 indicated by the target area information are converted to 003, 18460.

Thus, when TAC is used, unlike when the ACB information described above is used, the femtos 103 each reflect the configuration instruction D3 or the configuration file 312a thereof. In this case, the femtos 103 without a function of the RF unit 313 to not transmit a transmission message to the terminals 104.

FIG. 9B depicts a conversion message of the configuration instruction response D4 when transmitted from the femtos 103 to the GW 102. The protocol converting unit 304a retains the parameter of the post-conversion message example 932 indicated in FIG. 9A and generate the pre-conversion message 933. Here, the parameters of Warning Message Contents of the post-conversion message 932 in FIG. 9A are stored to EA (Emergency Area) ID.

As depicted in FIG. 9B, when configuration is successful, 004, 001 are newly stored to EAID (when configuration fails, 004, 000 are stored) as the pre-conversion message 933 of the configuration instruction response D4. The GW 102 converts the protocol for the pre-conversion message 933 and, generates a post-conversion message 934 of the configuration instruction response D4. Here, the parameters of EAID of the pre-conversion message 933 are converted to inform of the post-conversion message 934.

In the post-conversion message 934, when the all of femtos 103 indicated in units of HeNB Groups by the target area information have successfully performed configuration, Status of Inform is newly added and 001 is stored. When configuration has failed, 000 is stored. Alternatively, the number of the femtos 103 succeeding and failing to perform configuration may be stored.

In the embodiments hereinafter, at what portion of the communications system the femtos 103 to be subject to collective configuration for communication regulation are determined will be described. FIG. 10 is a chart depicting target femto determining units according to femto group type.

As depicted in FIG. 10, (1) the femto group 103 bundled through the GWs 102 are target femtos 103 determined through the GW 102. (2) In a case of collective configuration by EAID group, the femtos 103 themselves make the determination. (3) In a case of collective configuration by TA (Tracking Area) ID group, the GW 102 and the femtos 103 make the determination.

(1) "femto group bundled through the GWs" indicates the femtos 103 managed by a given GW 102. (2) "EAID group" is an emergency area range that can be defined by an operator. (3) "TAID group", for example, is a range obtained from a list of TACS that are LTE position registration areas. When moving from one position registration area to another position registration area, the terminals 104 must again perform position registration.

Figure 11:
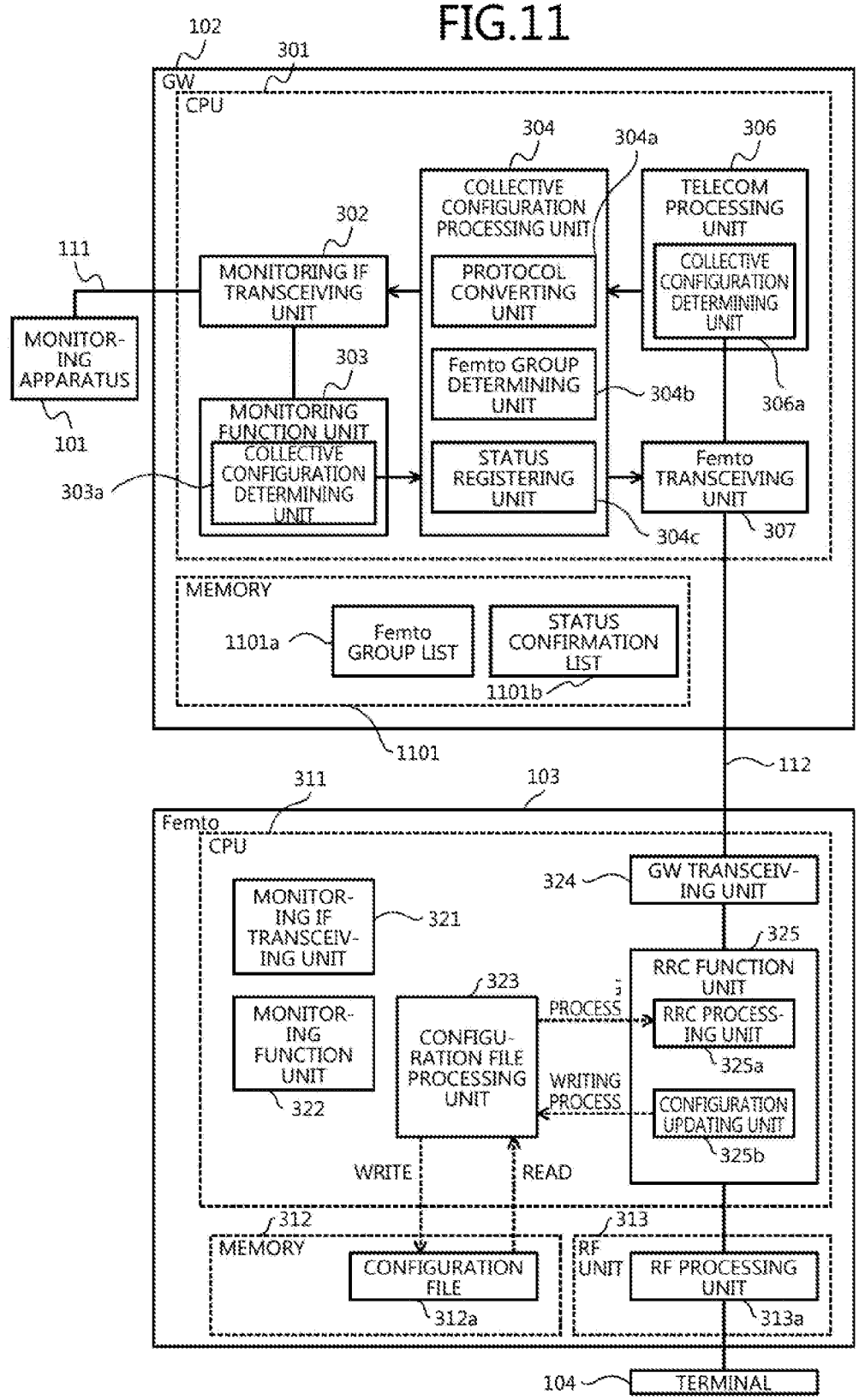
FIG. 11 is a block diagram depicting an example of configuration of the GW and base stations according to a second embodiment.

In a second embodiment, an example of configuration in a case where the GW determines the femtos to be subject to collective configuration at (1) above will be described. FIG. 11 is a block diagram depicting an example of configuration of the GW and base stations according to the second embodiment.

In FIG. 11, components identical to those depicted in FIG. 3 are given the same reference numerals used in FIG. 3. In the second embodiment, the collective configuration processing unit 304 of the GW 102 further includes a femto group determining unit 304b and a status registering unit 304c. Further, the CPU 301 includes in accessible memory 1101, a femto group list 1101a and a status confirmation list 1101b.

Configuration in a case of collective configuration from the monitoring apparatus 101 to the femtos 103 will be described. The monitoring apparatus 101 transmits a message of the collective configuration instruction D1 included in femto group information to the GW 102 by the monitoring IF 111. The GW 102 that receives the collective configuration instruction D1 converts the received message to the protocol for the call control IF 112 by the protocol converting unit 304a.

The femto group determining unit 304b refers to the femto group list 1101a on the memory 1101 of the GW 102 and determines the femto group to be subject to collective configuration. The femto group determining unit 304b, upon determining the femtos 103 to be subject to collective configuration, stores to the femto transceiving unit 307 and transmits to the femtos 103 to be subject to collective configuration, a message of the configuration instruction D3 after protocol conversion. Communication of the message among the femtos 103 is identical to that or the first embodiment.

Configuration in a case of configuration response from the femtos 103 to the monitoring apparatus 101 will be described. The femtos 103 that have finished configuration processing corresponding to the configuration instruction D3 send a configuration result to the monitoring apparatus 101. The femtos 103 store a message of the configuration instruction response D4 to GW transceiving unit 324 and transmit the message to the GW 102.

At the GW 102 that receives the message of the configuration instruction response D4, the protocol converting unit 304a converts the message of the protocol for the call control IF 112 to the protocol for the monitoring IF 111. The status registering unit 304c registers the configuration result in the message to the status confirmation list 1101b on the memory 1101. The GW 102, when the configuration instruction response D4 is returned from all of the femtos subject to collective configuration, transmits the status confirmation list 1101b to the monitoring apparatus 101.

Figure 12:
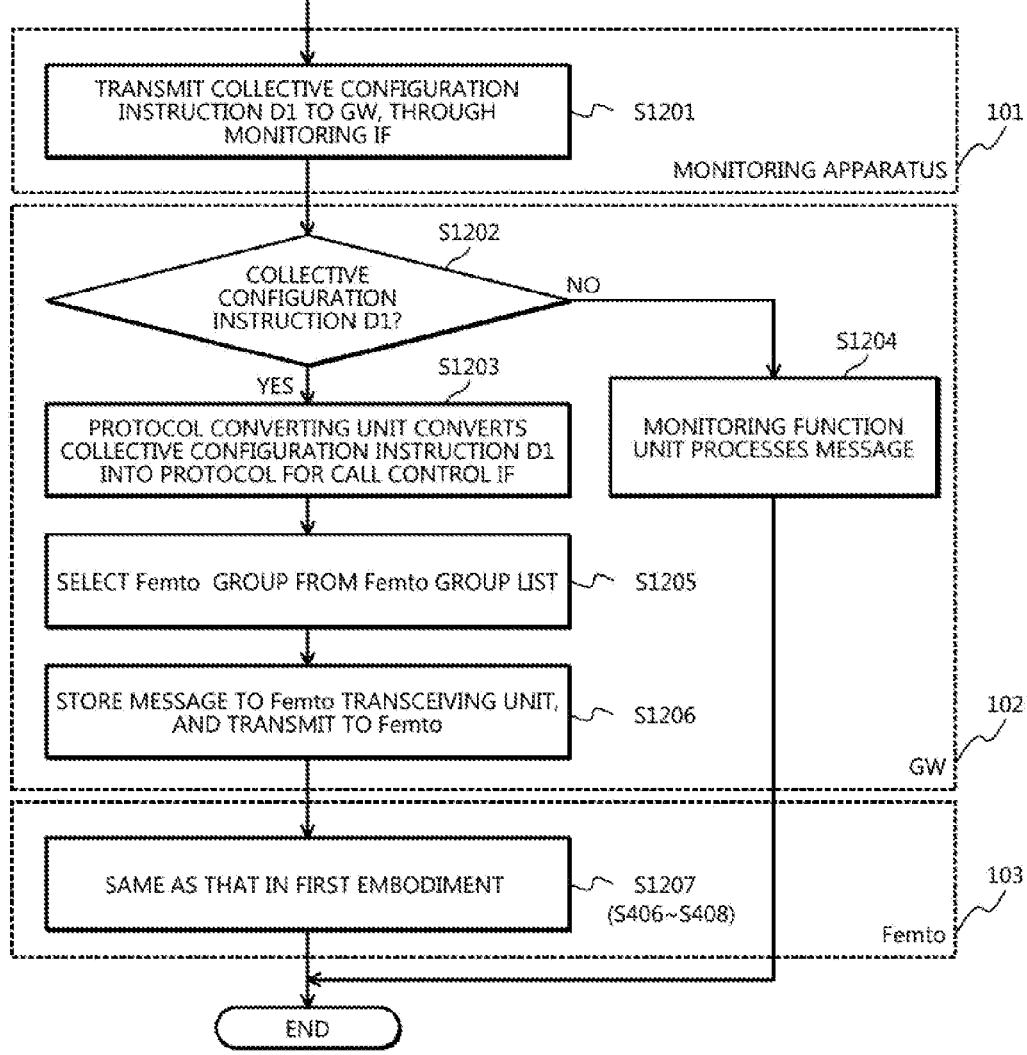
FIG. 12 is a flowchart of processing contents for a collective configuration instruction from the monitoring apparatus according to the second embodiment to the base stations, through the GW.

Alternatively, the status registering unit 304c may transmit to the monitoring apparatus 101 as the configuration instruction response D4, success/failure information associated with the IDs of the femtos that have responded. For example, a list of configuration success/failure for each of the femtos 103 may be transmitted such as that below.
femto1: 80 UE successful
femto2: 24 UE successful FIG. 12 is a flowchart of processing contents for a collective configuration instruction from the monitoring apparatus according to the second embodiment to the base stations, through the GW. The monitoring apparatus 101 transmits the collective configuration instruction D1 to the GW 102, through the monitoring IF 111 (step S1201).

The GW 102 determines whether the collective configuration instruction D1 has been received from the monitoring apparatus 101 (step S1202), and if the collective configuration instruction D1 has been received (step S1202: YES), the GW 102 converts the collective configuration instruction D1 of the protocol for the monitoring IF 111 to the protocol for the call control IF 112, by the protocol converting unit 304a (step S1203). On the other hand, at step S1202, if a message other than the collective configuration instruction D1 has been received (step S1202: NO), the GW 102 performs an existing message process, by the monitoring function unit 303 (step S1204), ending the processing of the flowchart.

After step S1203, the GW 102 selects from the femto group list 1101a, a femto group to be subject to collective configuration (step S1205). The GW 102 stores the configuration instruction D3 including the selected femto group to the femto transceiving unit 307, and transmits a message of the configuration instruction D3 to the femtos 103 (step S1206).

Thereafter, at step S1207, the femtos 103 perform. processing that is the same as that steps S406 to S408 of FIG. 4 in the first embodiment. In other words, the femtos 103 determine whether the configuration instruction D3 has been received (step S406), and if received (step S406: YES), the configuration updating unit 325b causes the configuration file processing unit 323 to perform writing processing for the configuration indicated by the configuration instruction D3 (step S407), and transitions to step S408. Thus, the configuration instruction D3 is written to the configuration file 312a.

If the configuration instruction D3 has not been received (step S406: NO), the femtos transition to step S408.

Thereafter, at step S408, the RPC processing unit 325a reads the configuration instruction D3 set in the configuration file 312a, by the configuration file processing unit 323, and transmits to the terminals 104, the configuration of the communication regulation indicated by the configuration instruction D3.

Figure 13:
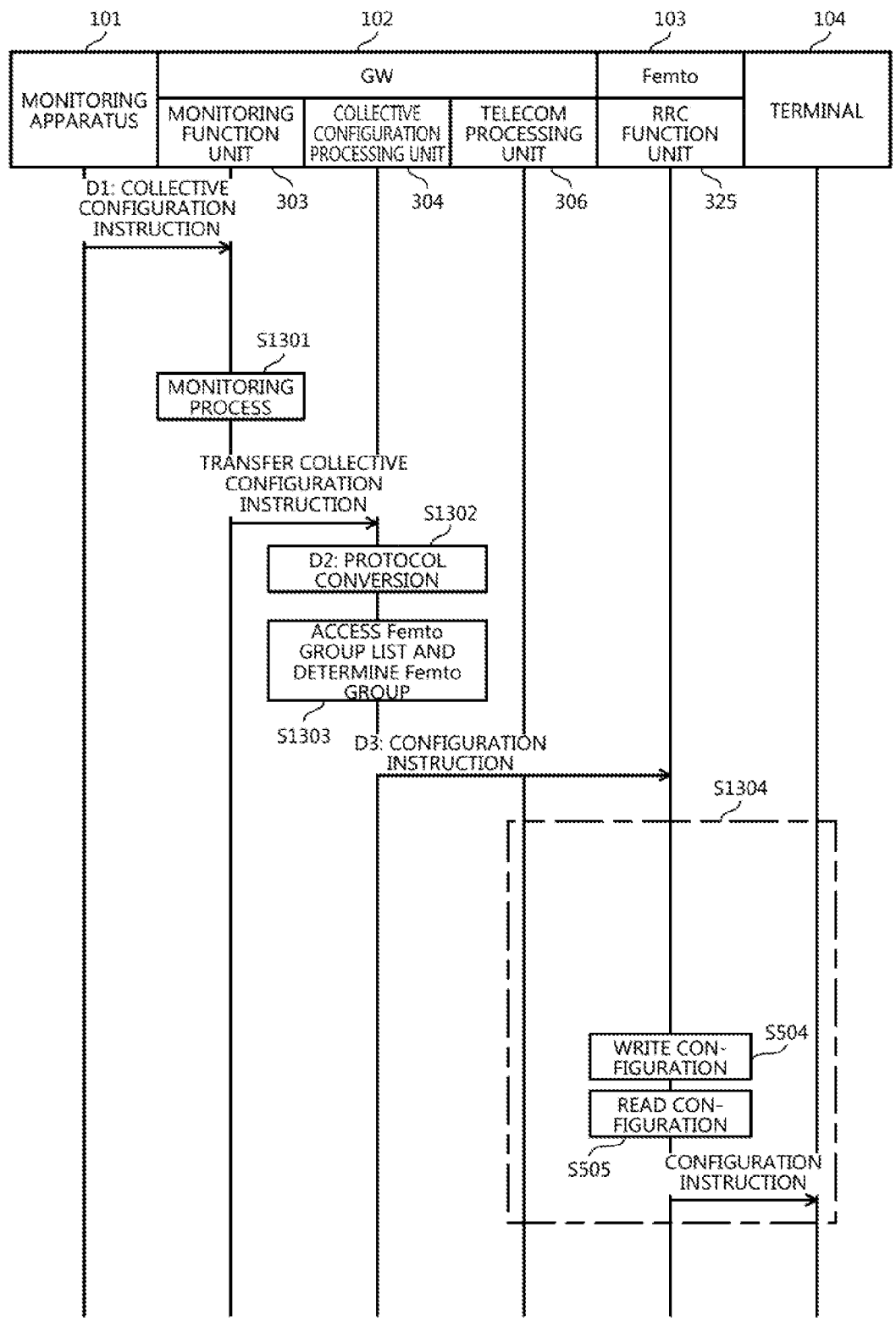
FIG. 13 is a sequence diagram depicting processing contents of a collective configuration instruction from monitoring apparatus according to the second embodiment to the base stations, through the GW.

FIG. 13 is a sequence diagram depicting processing contents of a collective configuration instruction from monitoring apparatus according to the second embodiment to the base stations, through the GW. The collective configuration instruction D1 transmitted from the monitoring apparatus 101 is received by the monitoring function unit 303 of the GW 102 and the monitoring function unit 303 performs the monitoring process (step S1301). In the case of the collective configuration instruction D1, the monitoring function unit 303 transfers the collective configuration instruction D1 to the collective configuration processing unit 304 and the collective configuration processing unit 304 performs the protocol conversion process D2 (step S1302).

The collective, configuration processing unit 304 of the GW 102, with respect to the configuration instruction D3 after protocol conversion, accesses the femto group list 1101a and determines a femto group to be subject to collective configuration (step S1303). The collective configuration processing unit 304 transmits the configuration instruction D3 to the femtos 103 of the femto group to be subject to collective configuration.

Hereinafter, at step S1304, the femtos 103 perform processing that is the same as that at steps S503 to S505 in FIG. 5 of the first embodiment. In other words, the RRC function unit 325 writes the configuration instruction D3 to the configuration file 312a by the configuration file processing unit 323 (step S504). The RRC function unit 325 writes the configuration file 312a, by the configuration file processing unit 323 (step S505), and transmits to the terminals 104, a configuration instruction including communication regulation.

Figure 14:
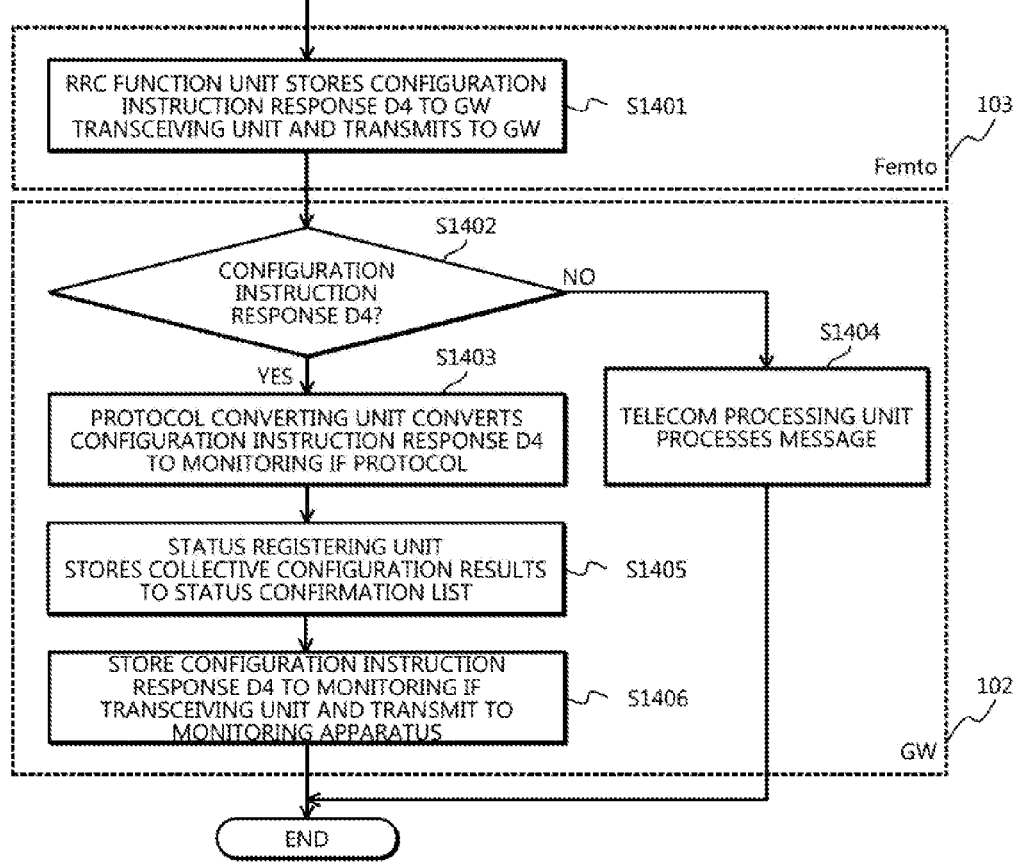
FIG. 14 is a flowchart of processing contents for a configuration instruction response from the base stations according to the second embodiment to the GW.

FIG. 14 is a flowchart of processing contents for a configuration instruction response from the base stations according to the second embodiment to the GW. The RRC function unit 325 of the femtos 103 stores the configuration instruction response D4 to the GW transceiving unit 324 and transmits the configuration instruction response D4 to the GW 102 (step S1401).

The GW 102 determines whether the received message is the configuration instruction response D4 for the configuration instruction D3 previously transmitted (step S1402). If the configuration instruction response D4 has been received (step S1402: YES), the GW 102 converts the configuration instruction response D4 of the protocol for the call control IF 112 to the protocol for the monitoring IF 111, by the protocol converting unit 304a (step S1403). If the received message is not the configuration instruction response D4 (and includes a case of a S1 message address to the MME) (step S1402: NO), the GW 102 processes the message, by the telecom processing unit 306 (step S1404), ending the processing of the flowchart.

After step S1403, the GW 102 stores collective configuration results to the status confirmation list 1101b, by the status registering unit 304c (step S1405). The GW 102 stores the configuration instruction response D4 to the monitoring IF transceiving unit 302, and transmits the status confirmation list to the monitoring apparatus 101 as the configuration instruction response D4, through the monitoring IF 111 (step S1406), ending the processing of the flowchart.

Figure 15:
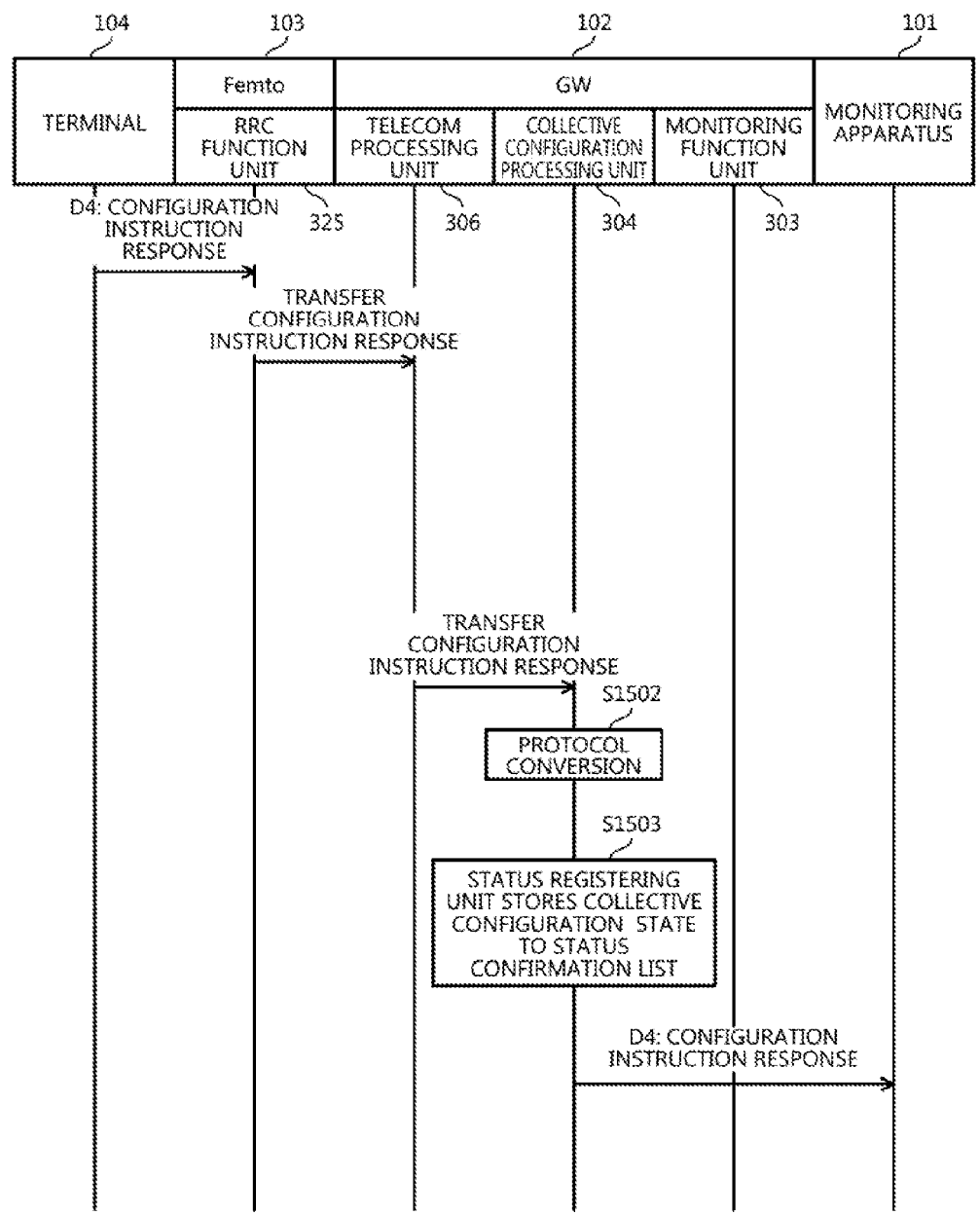
FIG. 15 is a sequence diagram depicting processing contents for a configuration instruction response from the base stations according to the second embodiment to the GW.

FIG. 15 is a sequence diagram depicting processing contents for a configuration instruction response from the base station according to the second embodiment to the GW. The terminals 104 execute processing for communication regulation corresponding to the configuration instruction D3, and transmit the configuration instruction response D4 to the femtos 103. The femtos 103 transfer the configuration instruction response D4 from the terminals 104 to the GW 102.

The telecom processing unit 306 of the GW 102 transfers the configuration instruction response D4 to the collective configuration processing unit 304. The protocol converting unit 304a of the collective configuration processing unit 304 converts the configuration instruction response D4 of the protocol for the call control IF 112 to the protocol for the monitoring IF (step S1502). The status registering unit 304c stores the collective configuration state of the femtos 103 to the status confirmation list 1101b (step S1503) and the status confirmation list 1101b is transmitted to the monitoring apparatus 101 as the configuration instruction response D4, by the monitoring IF transceiving unit 302 of the GW 102.

Figure 16:
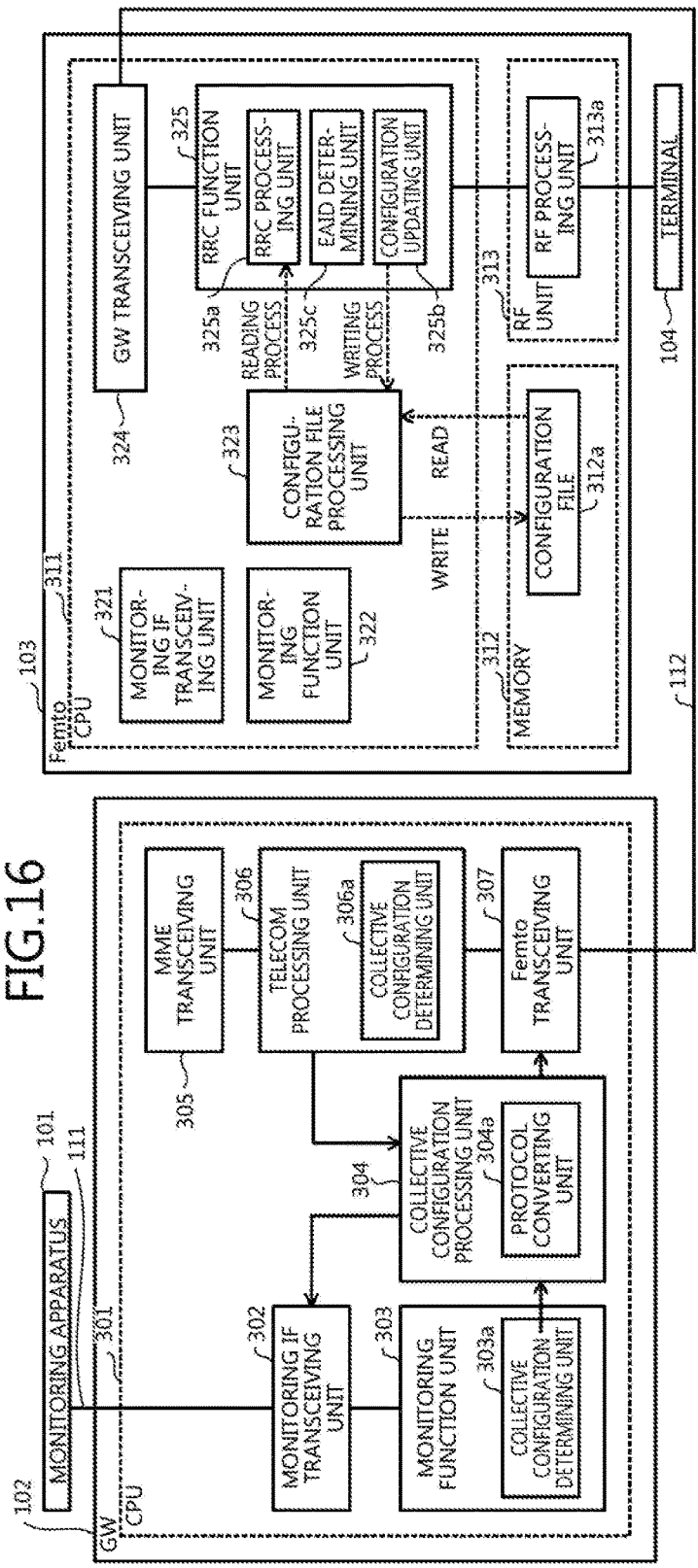
FIG. 16 is a block diagram depicting an example of configuration of the base stations and the GW according to a third embodiment.

In a third embodiment, an example of configuration in a case where (2) EAID described above is used by the femtos themselves to determine the femtos to be subject to collective configuration. FIG. 16 is a block diagram depicting an example of configuration of the base stations and the GW according to the third embodiment.

In FIG. 16, components identical to those depicted in FIG. 3 are given the same reference numerals used in FIG. 3. In third embodiment, the RRC function unit 325 of the femtos 103 includes an EAID determining unit 325c.

Configuration in a case of collective configuration from the monitoring apparatus 101 to the femtos 103 will be described. The monitoring apparatus 101 transmits to the GW 102, a message of the collective configuration instruction D1 including EAID, through the monitoring IF 111. The GW 102 that receives the collective configuration instruction D1 converts the received collective configuration instruction D1 to the protocol for the call control IF 112, by the protocol converting unit 304a. The femto transceiving unit 307 stores the message of the configuration instruction D3 after protocol conversion and transmits the configuration instruction D3 to the femtos 103.

The femtos 103 that receive the message of the configuration instruction D3 process the message of the Protocol for the call control IF 112, by the RRC processing unit 325a. The EAID determining unit 325c determines based on EAID information collectively specified and including in the configuration instruction D3, whether the femto 103 thereof is within a range of the EA in the message of the configuration instruction D3, and if in the EA range, executes configuration.

The EAID is defined by an operator and therefore, the monitoring apparatus 101 notifies and shares information of the EAID with the GW 102 in advance.

FIG. 16 further depicts a message example 1601 after protocol conversion and included in the configuration instruction D3 received by the femtos 103. In the message of the configuration instruction D3, 1310 is set as the Warning Area List (EA), and the EAID determining unit 325c of each of the femtos 103 executes the configuration instruction of the Warning Message Contents, when the EAID retained by the femto 103 thereof matches the Warning Area List (EA) included in the received configuration instruction D3. The EAID of the configuration instruction D3 is defined by the operator.

Figure 17:
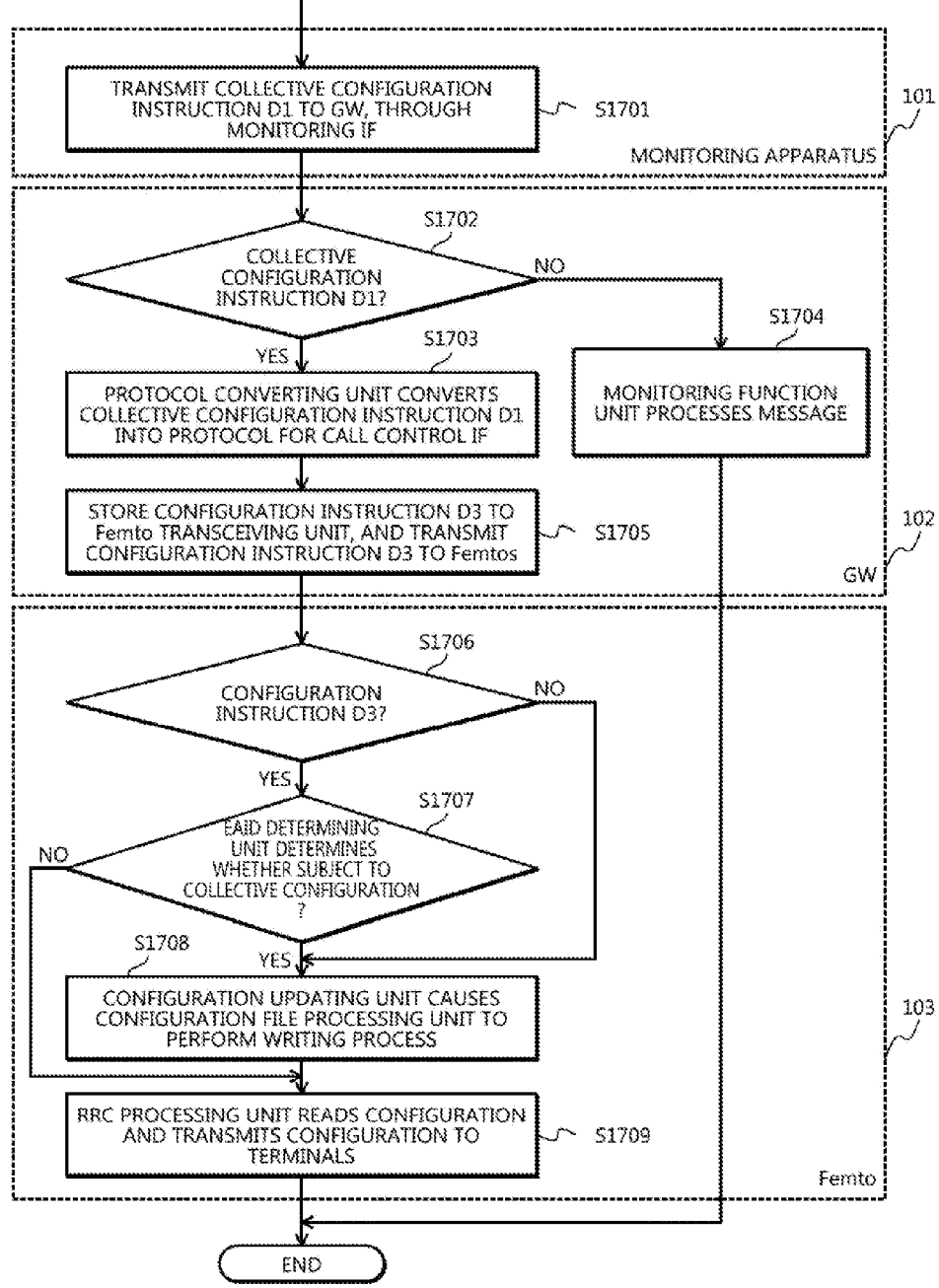
FIG. 17 is a flowchart of processing contents for a collective configuration instruction from the monitoring apparatus according to the third embodiment to the base stations, through the GW.

FIG. 17 is a flowchart of processing contents for a collective configuration instruction from the monitoring apparatus according to the third embodiment to the base stations, through the GW. The processing at steps S1701 to S1705 is the same as that in the first embodiment (steps S401 to S405 in FIG. 4). The monitoring apparatus 101 transmits the collective configuration instruction D1 to the GW 102, by the monitoring IF 111 (step S1701).

The GW 102 determines whether the collective configuration instruction D1 has been received from the monitoring apparatus 101 (step S1702), and if the collective configuration instruction D1 has been received (step S1702: YES), the GW 102 converts the collective configuration instruction D1 of the protocol for the monitoring IF 111 to the protocol for the call control IF 112, by the protocol converting unit 304a (step S1703). On the other hand, at step S1702, if a message other than the collective configuration instruction D1 has been received (step S1702: NO), the GW 102 performs existing message processing, by the monitoring function unit 303 (step S1704), ending the processing of the flowchart.

After step S1703, the GW 102 stores the configuration instruction D3 to the femto transceiving unit 307, and transmits a message of the configuration instruction D3 to the femtos 103 (step S1705).

Thereafter, the femtos 103 determine whether the configuration instruction D3 has been received (step S1706), and if received (step S1706: YES), each of the femtos 103 determines, by the EAID determining unit 325c, whether the femto 103 is a femto to be subject to collective configuration (step S1707). If the femto 103 is to be subject to collective configuration (step S1707: YES), the configuration updating unit 325b causes the configuration file processing unit 323 to perform a writing process of setting the configuration instruction D3 (step S1708), and transitions to step S1709.

At step S1707, if the femto 103 is not to be subject to collective configuration (step S1707: NO), the femto 103 transitions to step S1709. At step S1709, the RRC processing unit 325a reads the configuration instruction D3 and transmits configuration to the terminals 104 (step S1709), ending the processing of the flowchart.

Figure 18:
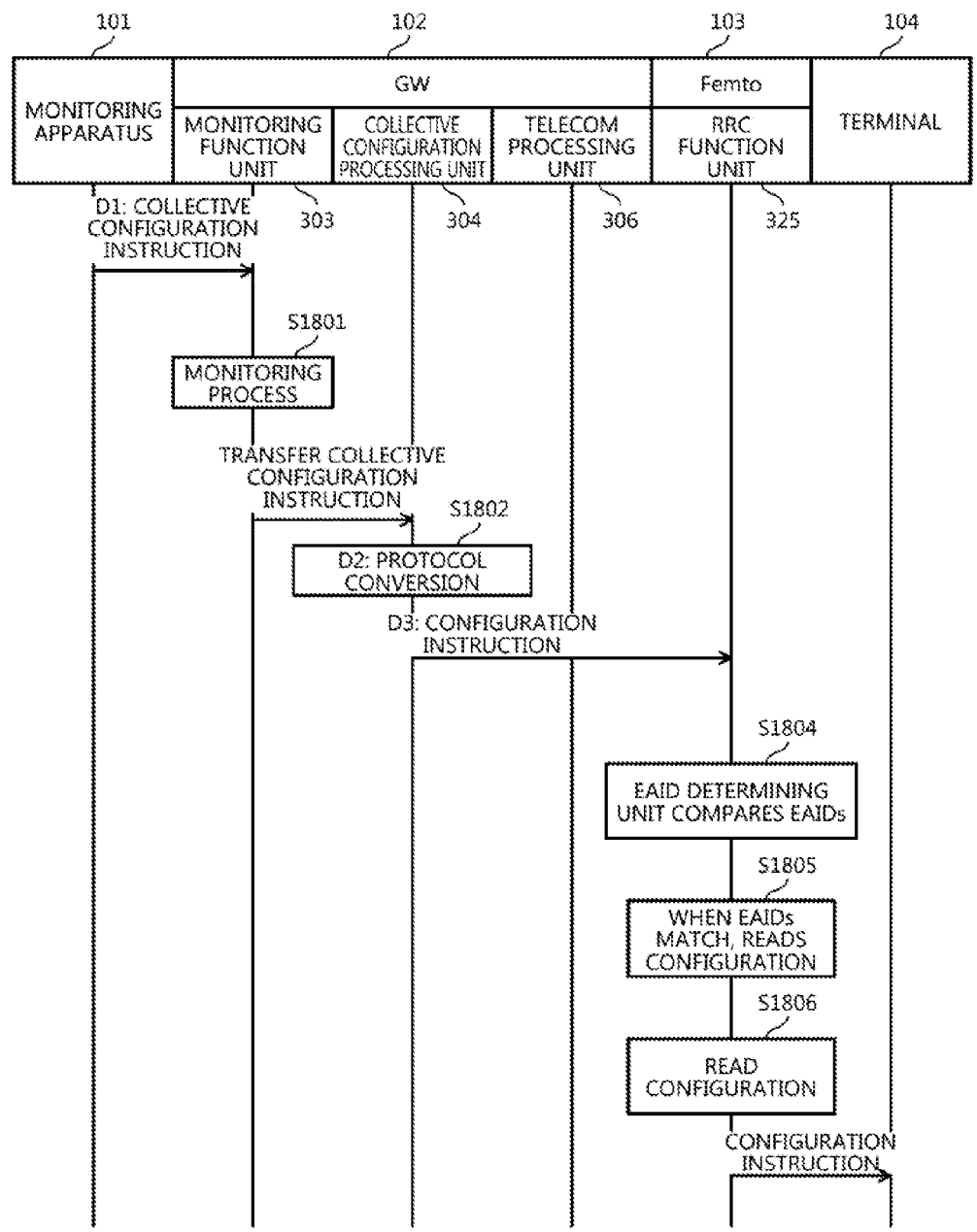
FIG. 18 is a sequence diagram depicting processing contents for a collective configuration instruction from the monitoring apparatus according to the third embodiment to the base stations, through the GW.

FIG. 18 is a sequence diagram depicting processing contents for a collective configuration instruction from the monitoring apparatus according to the third embodiment to the base stations, through the GW. The collective configuration instruction D1 transmitted from the monitoring apparatus 101 is received by the monitoring function unit 303 of the GW 102 and the monitoring function unit 303 performs the monitoring process (step S1801). The monitoring function unit 303, in a case of to collective configuration instruction D1, transfers the collective configuration instruction D1 to the collective configuration processing unit 304 and the collective configuration processing unit 304 performs the protocol conversion process D2 (step S1802).

The configuration instruction D3 after protocol conversion is transmitted from the GW 102 to the femtos 103. The EAID determining unit 325c determines whether the femto 103 thereof is included in the configuration instruction D3 (step S1804). If the femto 103 is included in the configuration instruction D3 (when matching), writing processing of setting the configuration instruction D3 is performed by the configuration updating unit 325b (step S1805) and thereafter, the configuration instruction D3 is read by the RRC processing unit 325a (step S1806), and a configuration instruction including communication. regulation is transmitted to the terminals 104. If the femto 103 is not included in the configuration instruction D3 (when not matching), the processing is ended and no configuration instruction including communication regulation is transmitted to the terminals 104.

The process flowchart and sequence diagram of the configuration instruction response D4 in the third embodiment are identical to those of the second embodiment (FIG. 14, FIG. 15) and description thereof is omitted.

In a fourth embodiment, an example of configuration in a case where (3) a TAID group is used and the GW 102 and the femtos 103 determine the femtos to be subject to collective configuration will be described. FIG. 19 is a block diagram depicting an example of configuration of the base stations and the GW according to the fourth embodiment. In FIG. 19, configuration related to the collective configuration instruction D1 from the GW 102 to the base stations 103 is depicted, and components identical to those in the first embodiment (FIG. 3) are given the reference numerals used in the first embodiment.

In the fourth embodiment, an example of a case where the collective configuration instruction D1 simultaneously changes the TACS of a femto group 103 of a given area will be described. The monitoring apparatus 101 uses the monitoring IF 111 and transmits to the GW 102, a message of the collective configuration instruction D1 by Set Parameter Values indicated in the pre-conversion message 931.

The GW 102 converts the message of the received collective configuration instruction D1 into a message for the call control IF 112, by the protocol converting unit 304a. In the protocol conversion example, as depicted in FIG. 9A, the pre-conversion message 931 is converted to the post-conversion message 932 (the configuration instruction D3) by protocol conversion with respect to the collective configuration instruction D1. The TAC information need not be notified to the terminals 104 and therefore, the femtos 103 are apparatuses of the terminus of notification of the configuration instruction D3.

FIG. 20 is a block diagram of configuration related to transmission of a configuration instruction response from the base station according to the fourth embodiment to the GW. In FIG. 20, components identical to those of the first embodiment (FIG. 6) are given the same reference numerals used in the first embodiment.

At the femtos 103, when TAC configuration is finished, as described above, configuration successful (001), or configuration failed (000) is combined with the configuration instruction response D4 as a message and returned to the GW 102. In the protocol conversion example, as depicted in FIG. 9B, the pre-conversion message 933 is converted to the post-conversion message 934 by protocol, conversion with respect to the configuration instruction response D4. At the GW 102, the message of the configuration instruction response D4 is transmitted to the monitoring apparatus 101 and therefore, a response message of the call control IF 112 is converted, to an Inform message, which is a message of the monitoring IF 111.

As described, in the second and third embodiments, an example of performing collective configuration using ACB information is described, and in the fourth embodiment, an example of performing collective configuration by changing the TAC is described. Without limitation hereto, in the actual environment, a predetermined message conversion algorithm may be used to similarly perform collective configuration. In this case, the monitoring apparatus 101 and the GW 102 define and share messages in advance. The femtos 103 perform existing processing and by the call control IF 112, the femtos 103 perform message processing of the configuration instruction D3.

Normally, in the communications system depicted in FIG. 1, one unit of the monitoring apparatus 101, several tens of units of the GW 102, and several tens of thousands of the femtos 103 are disposed, and configuration changes with respect to apparatuses other than the femtos 103 (the monitoring apparatus 101 and the GWs 102) described in the first to fourth embodiments may be may be performed with less burden and at a lower cost than configuration changes to the tens of thousands of femtos 103.

In a fifth embodiment, protocol conversion of the described messages will be described in detail.

A case where a portion information elements (IEs) of an existing message of a call control IF protocol is used as the collective configuration instruction D1 will be described. An example of message configuration will be described taking the ACB of the collective configuration instruction D1 as an example. To use the ACB, the monitoring apparatus 101, for example, uses TR069 IF as the monitoring IF 111 to send an instruction to the GW 102. Further, the GW 102 uses S1 IF as the call control IF 112. In TR069 TF, in the Set Parameter Values (refer to the pre-conversion message example 331, etc. in FIG. 3), target items and values thereof are stored. The monitoring apparatus 101 sends ACB regulation information and target HeNB information to the GW 102 and the GW 102 maps the ACB regulation information and the target HeNB information to a S1 message.

ACB configuration items, for example, are the type of communication regulated, the time that regulation is performed, a rough rate of the terminals subject to the regulation, terminals not subject to the regulation, etc. FIG. 21 is a chart depicting list of item contents and parameters of the ACB regulation information used by TR069 IF as the monitoring IF.

FIG. 22 is a chart depicting an example of mapping of a collective configuration request to a S1 message by the GW. The GM 102 that has received ACB configuration information included as the collective configuration instruction D1 from the monitoring apparatus 101 maps message contents to a S1 message (WRITE-REPLACE WARNING REQUEST) depicted in FIG. 21. In this case, for example, information necessary for ACE configuration may be stored to the Warning Message Contents.

FIG. 23 is a chart depicting a mapping example of a configuration request response using a S1 message from the base stations to the GW. Each of the femtos 103 stores the ID (eNB ID) thereof to a Broadcast Completed Area List of a WRITE-REPLACE WARNING RESPONSE and sends a message to the GW 102.

A case where a TAC is used in the collective configuration instruction D1 will be described. When a TAC is used on the collective configuration instruction D1, as depicted in FIG. 9A, be monitoring apparatus 101 transmits to the GW 102, a message of the collective configuration instruction D1 by the Set Parameter Values of the pre-conversion message 931 of the monitoring IF 111. The GW 102 converts the message of the received collective configuration instruction D1 to the post-conversion message 932 (the configuration instruction D3) of the call control IF 112 and transmits the message to the femtos 103.

On the other hand, as depicted in FIG. 9B, the configuration instruction response D4 from the femtos 103 adds configuration successful/configuration failed to the pre-conversion message 933 and is transmitted to the GW 102.

A case where IE is added to an existing message of the call control IF protocol and used as the collective configuration instruction D1 will be described. FIG. 24 is a chart depicting another example of mapping a collective configuration request to a S1 message by the GW. The GW 102 that has received ACB configuration information included as the collective configuration instruction D1 from the monitoring apparatus 101 adds IE to and maps a S1 message (WRITE-REPLACE WARNING REQUEST) depicted in FIG. 2. For example, the GW 102 stores predetermined value indicating the ACB regulation information as ACB Information. Corresponding to FIG. 24, a mapping example of configuration request responses using a S1 message from the base stations 103 to the GW 102 is the same as that of FIG. 23.

A case where a new message of the call control IF protocol is added and used as the collective configuration instruction D1 will be described. FIG. 25 is a chart depicting a S1 message example by the GW. In the figure, parameters 2501 are existing messages to which parameters 2502 of a new message are added. The parameters 2502 of the new message, for example, may the same as the items used by the monitoring IF 111 (TR069) described above.

Figure 26:
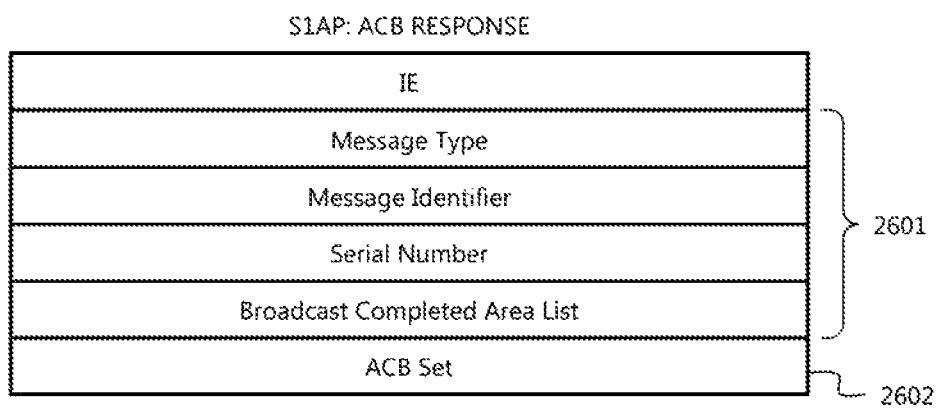
FIG. 26 is a chart depicting an example of mapping a configuration request response using a S1 message from the base stations to the GW.

FIG. 26 is a chart depicting an example of mapping a configuration request response using a S1 message from the base stations to the GW. In the figure, parameters 2601 are existing messages to which parameters 2602 of a new message are added. The new parameters 2602, for example, are ACB Set, and formed by information of configuration information (configuration successful/configuration failed) described above.

FIG. 27 is a sequence diagram depicting a procedure of a configuration instruction for the base station by an existing scheme. A procedure of configuration processing for the base station by an existing technique is depicted uses FIG. 27 and compared to the embodiments.

The monitoring apparatus 101 transmits the configuration instruction D30 to the femtos 103 sequentially one-by-one through the monitoring IF 111. At each of these transmissions, the connection connecting D0 and connection disconnecting D6 of a monitoring protocol by the monitoring apparatus 101 and the femtos 103 consumes time. Further, in the monitoring protocol, the number of session connections that can be performed concurrently is limited and therefore, for example, configuration instructing has to be divided for every 100 units. In FIG. 27, after transmission of the configuration instruction D30 to a femto #100(103) by the monitoring apparatus 101, although the configuration instruction response D40 from the first femto #1(103) is sent, the femtos 103 when receiving the configuration instruction D30, suitably transmit the configuration instruction response D40 at the time when configuration processing is finished.

In comparing FIG. 27 and the first embodiment (FIG. 2), in the embodiment, the monitoring apparatus 101 completes the connection connecting D0 and the connection disconnecting D6 of the monitoring protocol with each of the femtos 103 by the collective configuration instruction D1 in a single session and therefore, may significantly reduce the processing time compared to the existing scheme (FIG. 27). Here, the time that the monitoring apparatus 101 is connected to the GW 102 is also reduced, enabling the processing load of the monitoring apparatus 101 to be reduced. In other words, the call control IF 112 between the GW 102 and the base stations 103 is continuously connected, making negotiation for connection unnecessary to enable communication configuration of the base stations 103 to be performed all at once.

Further, the GW 102 is continuous connected to the base stations (femtos) 103 through the call control IF 112; and using an existing message, the GW 102 and the base stations 103 exchange messages. Thus, without processing load on the GW 102 or the base stations 103, communication configuration of the base stations 103 (and the terminals 104) may be performed collectively. Here, without affecting a core node such as the higher-level MME of the GW 102, communication configuration of only the base stations 103 subordinate to the GW 102 monitored by the monitoring apparatus 101 may be performed.

According to the embodiments described above, a collective configuration instruction including a message for communication regulation, etc. may be transmitted to numerous base stations in a short amount of time from the monitoring apparatus. Further, the configuration state of numerous base station apparatuses may be returned to the monitoring apparatus in a short amount of time. Without adding servers of the monitoring apparatus for monitoring and configuring numerous base station apparatuses, monitoring and configuration may be performed quickly by a single monitoring apparatus. As a result, for example, even when emergency communication regulation becomes necessary consequent to an unexpected disaster, the communication regulation of plural base stations may be implemented all at once.

Nonetheless, with the conventional techniques, configuration information for communication regulation cannot be sent from the monitoring apparatus to plural base stations all at once. For example, when an unexpected disaster occurs, communication regulation information cannot be sent to urgently to several tens of thousands of base stations and communication regulation between the terminals and the base stations cannot be performed.

In sending configuration information for communication regulation through the monitoring I/F, after performing connection start processing with each base station one at a time sequentially, the monitoring apparatus has to perform connection disconnection processing of communication completion. Therefore, monitoring apparatus cannot send communication regulation information to the base stations all at once, and the greater the number of base stations, the more time is consumed. Further, monitoring apparatus cannot simultaneously process responses from numerous base stations. Although adding more monitoring apparatuses (servers) enables the processing capacity to be increased, cost also increases. Further, apparatuses capable of parallel processing using the monitoring IF by improving processing capacity cannot send configuration information to numerous base stations all at once consequent to processing for starting communication and processing for ending communication.

According to one aspect of the embodiments, communication configuration of plural base stations can be performed all at once.

A program executed by the CPUs of the base stations (femtos) 103 and the GW 102 related to collective configuration described in the embodiments may be realized by a executing a prepared program on a computer. Further, the program is recorded to a non-transitory, computer-readable recording medium such as semiconductor memory, a hard disk, a flexible disk, CD-ROM, MO, DVD, etc., and is executed by being read out from the recording medium by a computer. Further, the program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A gateway apparatus comprising:
a first inter-device interface configured to communicate with a monitoring apparatus;
a second inter-device interface configured to communicate with a plurality of base station apparatuses that are subordinate;
a memory; and
a processor coupled to the memory and configured to:
receive first configuration information for the plurality of base station apparatuses by a single connection to the monitoring apparatus through the first inter-device interface,
generate second configuration information by a protocol conversion of converting the first configuration information to a format compatible with the second inter-device interface, and
transmit the generated second configuration information to the plurality of base station apparatuses through the second inter-device interface.

2. The gateway apparatus according to claim 1, wherein:
the first inter-device interface is a monitoring interface, and
the second inter-device interface is a call control interface.

3. The gateway apparatus according to claim 1, wherein the processor, when receiving response information of a configuration state based on the second configuration information from the plurality of base station apparatuses, collectively transmits the response information from the plurality of base station apparatuses to the monitoring apparatus.

4. The gateway apparatus according to claim 1, wherein the processor is further configured to determine whether information received from the monitoring apparatus is the first configuration information, the processor performing the protocol conversion on the first configuration information and transmitting the generated second configuration information to the plurality of base station apparatuses, when determining that the information received from the monitoring apparatus is the first configuration information.

5. The gateway apparatus according to claim 1, wherein the processor is further configured to determine, among the plurality of base station apparatuses, a group to be subject to collective configuration included in the first configuration information received from the monitoring apparatus.

6. The gateway apparatus according to claim 1, wherein the processor, when an area range subject to collective configuration is included in the first configuration information received from the monitoring apparatus, transmits the second configuration information to all of the plurality of base station apparatuses that are subordinate and causes the plurality of base station apparatuses to determine presence of configuration based on the area range.

7. The gateway apparatus according to claim 1, wherein the processor, when a change of information of a tracking area code (TAC) is included in the first configuration information received from the monitoring apparatus, transmits the second configuration information to all of the plurality of base station apparatuses that are subordinate and causes the plurality of base station apparatuses to determine presence of configuration based on the change of information of the TAC.

8. The gateway apparatus according to claim 2, wherein the processor uses a portion of messages used by the call control interface or adds a new message to transmit the second configuration information to the plurality of base station apparatuses.

9. The gateway apparatus according to claim 8, wherein the processor receives from the monitoring apparatus, the first communication regulation information for the plurality of base station apparatuses to perform communication regulation with subordinate terminal apparatuses, and transmits to the plurality of base station apparatuses, the message corresponding to a communication regulation item of the first configuration information.

10. The gateway apparatus according to claim 8, wherein the processor uses information of access class barring (ACB) as the message.

11. The gateway apparatus according to claim 8, wherein the processor uses information of a tracking area code (TAC) as the message.

12. A communications system in which a monitoring apparatus is connected to a plurality of base station apparatuses through a gateway apparatus,
wherein:
the monitoring apparatus transmits first configuration information for the plurality of base station apparatuses through a first inter-device interface configured to communicate with the gateway apparatus,
the gateway apparatus includes:
a memory, and
a processor coupled to the memory and configured to:
receive first configuration information for the plurality of base station apparatuses by a single connection to the monitoring apparatus through the first inter-device interface,
generate second configuration information by a protocol conversion of converting the first configuration information to a format compatible with a second inter-device interface, and
transmit the generated second configuration information to the plurality of base station apparatuses through the second inter-device interface configured to communicate with the plurality of base station apparatuses, and
the plurality of base station apparatuses perform communication control with subordinate terminal apparatuses based on the second configuration information received from the gateway apparatus.

13. The communications system according to claim 12, wherein the gateway apparatus, when response information of a configuration state based on the second configuration information is received from the plurality of base station apparatuses, collectively transmits the response information from the plurality of base station apparatuses to the monitoring apparatus.

* * * * *